United States Patent
Asano

(10) Patent No.: US 7,885,895 B2
(45) Date of Patent: Feb. 8, 2011

(54) INFORMATION PROCESSING APPARATUS, CONTENT INFORMATION MANAGEMENT METHOD AND COMPUTER PROGRAM

(75) Inventor: Tomoyuki Asano, Kanagawa (JP)

(73) Assignee: Sony Corporation, Tokyo (JP)

( * ) Notice: Subject to any disclaimer, the term of this patent is extended or adjusted under 35 U.S.C. 154(b) by 1710 days.

(21) Appl. No.: 10/912,457

(22) Filed: Aug. 5, 2004

(65) Prior Publication Data

US 2005/0071279 A1 Mar. 31, 2005

(30) Foreign Application Priority Data

Aug. 7, 2003 (JP) .............................. 2003-289330

(51) Int. Cl.
*G06F 21/00* (2006.01)
(52) U.S. Cl. ............................. 705/57; 705/7; 705/51; 705/52; 705/64; 380/3; 380/4; 380/25; 380/201; 380/202; 709/317; 709/225; 709/229; 709/231; 709/232; 725/30; 725/31; 725/87; 725/104
(58) Field of Classification Search ..................... 705/7, 705/57, 51, 52, 64; 380/3, 4, 25, 201, 202; 709/217, 225, 229, 231, 232; 725/30, 31, 725/87, 104
See application file for complete search history.

(56) References Cited

U.S. PATENT DOCUMENTS

| 6,658,566 | B1 |  | 12/2003 | Hazard |  |
|---|---|---|---|---|---|
| 6,744,894 | B1 | * | 6/2004 | Saito | ........................... 380/277 |
| 6,774,894 | B1 | * | 8/2004 | Lin et al. | .................... 345/419 |
| 6,885,748 | B1 | * | 4/2005 | Wang | ........................... 380/201 |
| 6,959,288 | B1 | * | 10/2005 | Medina et al. | ................. 705/51 |
| 7,010,697 | B2 | * | 3/2006 | Byrne et al. | ................. 713/193 |
| 7,136,838 | B1 | * | 11/2006 | Peinado et al. | ................. 705/59 |
| 7,209,900 | B2 | * | 4/2007 | Hunter et al. | ................. 705/58 |
| 7,213,005 | B2 | * | 5/2007 | Mourad et al. | ................. 705/64 |

FOREIGN PATENT DOCUMENTS

| JP |  | 10-020779 | 1/1998 |
| JP |  | 11-510678 | 9/1999 |
| JP |  | 2000-224155 | 8/2000 |
| JP |  | 2001-111543 | 4/2001 |
| JP |  | 2001-118329 | 4/2001 |
| JP |  | 2002-063763 | 2/2002 |
| JP |  | 2002-290395 | 10/2002 |
| JP |  | 2003-110548 | 4/2003 |

* cited by examiner

*Primary Examiner*—Pierre Eddy Elisca
*Assistant Examiner*—Shahid Kamal
(74) *Attorney, Agent, or Firm*—Finnegan, Henderson, Farabow, Garrett & Dunner, L.L.P.

(57) ABSTRACT

A content providing server connected to a home network or the like is configured in such a way as to store a content key, which is encrypted by a network key shared by network-connected devices and appropriately updated, in a storage together with encrypted content, and as to hold a network key table in which all network keys including all pre-update network keys, which are being applied to encrypted content keys, are registered and stored. This server performs a key changing operation of changing a content key, which is encrypted by a pre-update network key, to an encrypted key, to which an updated network key is applied, only when needed, for example, at an occurrence of utilization of the content. Consequently, this configuration prevents key changing operations from being wastefully performed. Thus, the processing load on the server is alleviated.

16 Claims, 19 Drawing Sheets

FIG.6

| TIME | HOME NETWORK KEY |
|---|---|
| t1 | $HK_{t1}$ |
| t2 | $HK_{t2}$ |
| ⋮ | ⋮ |
| tn | $HK_{tn}$ |
| | |
| | |

FIG.11

| TIME | ENCRYPTED CONTENT KEY |
|---|---|
| t1 | $E(HK_{t1}, KC_1)$ |
| t1 | $E(HK_{t1}, KC_2)$ |
| t2 | $E(HK_{t2}, KC_3)$ |
| t3 | $E(HK_{t3}, KC_4)$ |
| ⋮ | ⋮ |

# INFORMATION PROCESSING APPARATUS, CONTENT INFORMATION MANAGEMENT METHOD AND COMPUTER PROGRAM

CROSS REFERENCE TO RELATED APPLICATIONS

The present document is based on Japanese Priority Application JP2003-289330 filed to the Japanese Patent Office on Aug. 7, 2003, the content in which being incorporated herein by reference to the extent permitted by law.

BACKGROUND OF THE PRESENT INVENTION

1. Field of the Present Invention

The present invention relates to an information processing apparatus, a content information management method, and a related computer program. More particularly, the present invention relates to an information processing apparatus, a content information management method and a related computer program, which are enabled to efficiently update a key for content security in an environment wherein encrypted content stored in a content providing server or the like connected to, for example, a home network is utilized in various kinds of network-connected equipment.

2. Related Art

With the nowadays popularized data communication networks, what is so called a home network, in which household electric appliances, computers, and other peripheral devices are network-connected thereby enabling mutual communication, has become increasingly widespread. The home network provides convenience and comfort by performing communication among network-connected devices to thereby share data processing functions thereof, and by perform transmission and reception (communication) of content among them. Home networks are expected to become increasingly popular in the future.

Meanwhile, various software data (hereunder referred to as content) like audio data such as music, image data such as movies, game programs, and various kinds of application programs can be stored in recording media, for example, a DVD (Digital Versatile Disc), a MD (Mini Disc), a CD (Compact Disc), solid state storage media such as semiconductor memories, etc., as digital data. Additionally, in recent years, a high-density recordable disc utilizing a blue laser has been developed. Digital content is stored in such various information recording media and provided to users. A user reproduces and utilizes the content in a reproducing device, such as his/her own PC (Personal Computer), disc player, etc.

In general, the rights of distribution of many kinds of content, such as music data and image data, are in possession of manufacturers and sellers thereof. Therefore, it is general that certain restrictions are imposed on the utilization of that content at the time of distribution thereof, that is, only regular users are permitted to utilize the content thereby to prevent unauthorized copying thereof from being performed.

SUMMARY OF THE PRESENT INVENTION

Digital data recording/reproducing enables the repetition of recording/reproducing of digital data without degrading image and audio quality. This results in occurrences of a problem of distribution of pirated discs obtained by copying the content to data recordable media, such as a CD-R, and the problem of bugging and exploitation of content, which are owned by others, through the Internet, wireless LANs and the like.

In a configuration in which a plurality of PCs and reproducing devices are network-connected, content stored in a server is utilized by being accessed from various network-connected devices and by being reproduced through the individual network-connected devices. In a case of employing such a content utilization mode, it is necessary from the viewpoint of content copyright protection to allow only the utilization of content in a specific network area, for instance, in devices connected to a home network, and to eliminate the utilization of the content by externally accessing, for instance, through the Internet and by being illicitly accessed through a wireless LAN.

In other words, a secure home network is constructed by plural devices within a house or residence. It is necessary to construct an environment adapted so that any device provided in the network can reproduce the content stored in a content server in the network, whereas the content cannot be reproduced in a case when an unauthorized external device accesses the content.

By the way, as a technique for constructing a secure home network, a configuration, in which devices in the home network share a key (a home network key) needed for utilizing content, has been proposed. To minimize damage even in a case where the home network key is divulged, the updating of the home network key is performed periodically, for example, every month, alternatively, when the configuration of the network is changed.

In the content server for storing the content in the network, a content key for decrypting the content is encrypted by the home network key. If another device in the network utilizes this content, the content key, which is encrypted by the home network key, and content data, which is encrypted by the content key, are transmitted to a content request device. The content request device decrypts the encrypted content key by the home network key to thereby obtain the content key. The content request device decrypts the encrypted content by the obtained content key to thereby utilize the content.

In the configuration utilizing such a home network key and the content key, it is necessary that when the home network key is updated, the content server decrypts all the content keys, which are stored therein, that is, the content keys encrypted by the pre-update home network key once, and that then, the content server performs an operation of reencrypting the decrypted content keys by the newly updated home network key.

However, it is necessary to perform this operation of changing the key on all the content keys stored by the server. Therefore, in a case where there is a large amount of the content stored in the server, and where the number of the content keys is large, a quantity of work is huge. This causes the problem of increase in the processing load on the server. Additionally, it is often that a certain content key is not utilized until the next update of the home network key. In such a case, an operation of changing the keys, which is performed in the server, is a thoroughly wasteful operation. Thus, there is the problem that the server increases the load by the wasteful operation.

As above-mentioned, it is inefficient to perform the changing of the key for encrypting the content keys in the content providing server in the home network, for example, at every update of the key (the home network key) shared among the devices in the home network. This is because the encrypted content key, which may be actually unused, for the content is changed.

The present invention has been conceived in view of such circumstances. More concretely, the content server stores plural home network keys and performs an operation of changing the content keys only when needed. The present invention aims at providing an information processing apparatus that realizes efficiency enhancement by such processing configuration, a content management method, and a computer program.

According to a preferred embodiment of the present invention, the content server is enabled to store plural home network keys including those of the past. The configuration according to the present invention is adapted to perform the encryption of the content key, to which the latest home network key, only in, for example, cases that an operation of utilization of content occurs, that new content is brought into the home network, or that the server cannot store any more home network key used for encrypting the content key. The present invention provides an information processing apparatus and a content information management method, and a computer program, which are enabled to reduce the load on the server by performing an operation of changing the key only when required.

According to a preferred embodiment of the present invention, there is provided an information processing apparatus having a function of a content server for providing content to network-connected devices. The information processing apparatus includes a storage for storing encrypted content and an encrypted content key, which is data obtained by encrypting a content key applied to decryption of the encrypted content and by a network key set as a key shared with the network-connected devices and appropriately updated; and a network key table in which network keys including all pre-update network keys, which are being applied as encryption keys for the encrypted content keys stored in the storage, are registered and stored.

Further, in another preferred embodiment of the present invention, the information processing apparatus is characterized in that the content key encrypted by the pre-update network key stored in the storage is maintained in the storage under the condition that an operation of updating the network key is performed, without performing a key changing operation by using an updated network key as an encryption key.

Furthermore, in another preferred embodiment of the present invention, the information processing apparatus is characterized in that, if an encrypted content key associated with content, on which an operation of utilization is performed, is stored in the storage as a content key encrypted by an pre-update network key differing from an updated network key, under the condition that there is an operation of utilization of the encrypted content stored in the storage, a key changing operation is performed of updating the encrypted content key to an encryption content key applying the updated network key.

Further, in still another preferred embodiment of the present invention, the information processing apparatus is characterized in that the encrypted content, which is stored in the storage, and an encrypted content key applying an updated network key generated by performing the key changing operation, are sent to a device requesting utilization of the encrypted content.

Furthermore, in another preferred embodiment of the present invention, the information processing apparatus has a mechanism of performing a key changing operation of updating an encrypted content key to an encrypted content key applying the updated network key for all encrypted content keys applying a same pre-update network key as the pre-update network key applied to the encrypted content key corresponding to the content to be utilized, and deleting the pre-update network key from the network key table.

Further, in another preferred embodiment of the present invention, the information processing apparatus has a current network key memory for storing an updated network key; and mechanism of performing a process of transfer of the updated network key from the current network key memory to the network key table, if a storing process is performed against the storage of the encrypted content key applying the updated network key.

Furthermore, in another preferred embodiment of the present invention, the information processing apparatus has a mechanism of performing encryption applying an updated network key stored in the current network key memory at event of generation of an encrypted content key corresponding to content newly inputted to the storage; storing the encrypted content key generated by the encryption process; and transferring the updated network key from the current network key memory to the network key table.

Also, in another preferred embodiment of the present invention, the information processing apparatus has a mechanism of selecting a network key to be deleted from the pre-update network keys already stored in the network table at time of storage of a new updated network key to the network key table, and storing the updated network key into the network key table if the deleting process is complete.

Furthermore, in another preferred embodiment of the present invention, the information processing apparatus further has a mechanism of acquiring an encrypted content key stored in the storage as an encrypted key applying the network key to be deleted; performing a key changing operation for changing to an encrypted key encrypted by an encrypted network key to be stored in the network key table; and deleting the network key to be deleted from the network key table if the key changing operation is complete.

Further, in another preferred embodiment of the present invention, the process of selecting the network key to be deleted is performed as an operation of selecting an oldest network key from pre-update network keys stored in the network key table.

Furthermore, in another preferred embodiment of the present invention, the process of selecting the network key to be deleted is performed as an operation of selecting an network key from the pre-update network keys stored in the network key table which minimizes a number of necessary processes of performing the key changing operation.

Further, according to another preferred embodiment of the present invention, there is provided a content information management method for use in a content providing server containing in storage, encrypted content and an encrypted content key encrypted by an updated network key set as a key shared with network-connected devices and including encrypted data of content key used in decryption of the encrypted content including encrypted, the method including a judgment step of judging whether or not an encrypted content key corresponding to content to be utilized is stored in the storage as an encrypted content key encrypted by an pre-update network key differing from the updated network key, on condition that there is an operation of utilization of the encrypted content stored in the storage; and a key changing step of updating the encrypted content key to an encrypted content key applying the updated network key if it is judged in the judging step that an encrypted content key associated with content to be utilized is stored in the storage as an encrypted content key encrypted by an pre-update network key differing from the updated network key.

According to another preferred embodiment of the invention, the content information management method further has the step of transmitting the encrypted content stored in the storage and the encrypted content key applying the updated network key generated in the key changing step to a device requesting for utilization of encrypted content.

Also, the content information management method may further have the step of performing the key changing operation of updating an encrypted content key to an encrypted content key applying the updated network key for all encrypted content keys applying a same pre-update network key as the pre-update network key applied to the encrypted content key corresponding to the content to be utilized, and deleting the pre-update network key from the network key table.

In addition, the content information management method may further has the steps of storing the updated network key in a current network key memory; and transferring the updated network key from the current network memory to the network key table if there is an operation of storing the encrypted content key applying the updated network key into the storage.

The content information management method according to another preferred embodiment of the present invention may further include the steps of performing encryption applying an updated network key stored in the current network key memory at event of generation of an encrypted content key corresponding to content newly inputted to the storage; storing the encrypted content key generated by the encryption process; and transferring the updated network key from the current network key memory to the network key table.

In addition, the content information management method according to another preferred embodiment of the present invention further has the step of selecting a network key to be deleted from the pre-update network keys already stored in the network table at time of storage of a new updated network key to the network key table, and storing the updated network key into the network key table if the deleting process is complete.

Moreover, the content information management method may further include the steps of acquiring an encrypted content key stored in the storage as an encrypted key applying the network key to be deleted; performing a key changing operation for changing to an encrypted key encrypted by an encrypted network key to be stored in the network key table; and deleting the network key to be deleted from the network key table if the key changing operation is complete.

Further, in the content information management method according to a preferred embodiment of the present invention has the step of selecting the network key to be deleted performed as an operation of selecting an oldest network key from pre-update network keys stored in the network key table.

In addition, the step of selecting the network key to be deleted may be performed as an operation of selecting an network key from the pre-update network keys stored in the network key table which minimizes a number of necessary processes of performing the key changing operation.

Still further, according to another preferred embodiment of the present invention, there is provided a computer-readable program for causing a computer to perform the steps of a content information management process for use in a content providing server containing in storage, encrypted content and an encrypted content key encrypted by an updated network key set as a key shared with network-connected devices and including encrypted data of content key used in decryption of the encrypted content including encrypted, the program including judgment step of judging whether or not an encrypted content key corresponding to content to be utilized is stored in the storage as an encrypted content key encrypted by an pre-update network key differing from the updated network key, on condition that there is an operation of utilization of the encrypted content stored in the storage; and key changing step of updating the encrypted content key to an encrypted content key applying the updated network key if it is judged in the judging step that an encrypted content key associated with content to be utilized is stored in the storage as an encrypted content key encrypted by an pre-update network key differing from the updated network key.

It should be noted that the computer program according to the preferred embodiment of the present invention can be provided through various storage media, communication media, for instance, a CD, an FD (Floppy Disk), and an MO (Magneto-optical disk), etc., or a communication medium, such as a network, which is provided in a computer-readable format, to, for example, a computer system that can execute various kinds of program codes. Processing according to the program can be realized by providing such a program in a computer readable format.

In the present specification, the term "system" may designate a logical set of plural devices as the occasion requires. The devices in each of the configurations are not limited to those provided in the same casing.

Therefore, according to the configuration of the present invention, there is provided a content providing server for holding a content key encrypted by a network key, which is shared by network-connected devices in a home network or the like and appropriately updated, in a storage, together with encrypted content. The content providing server is configured in such a way as to hold a network key table in which network keys including all pre-update network keys, which are being applied as encryption keys for the encrypted content keys stored in the storage, are registered and stored. Thus, it is sufficient to perform a key changing operation of changing a content key, which is encrypted by a pre-update network key, to an encrypted key, to which an updated network key is applied, only when needed, for example, at an occurrence of utilization of the content. Consequently, key changing operations wastefully performed are reduced to thereby alleviate processing load.

Further, a current network key memory for storing an updated network key is set therein. Thus, when the updated network key is applied to the encryption of the encrypted content key, the updated network key is moved and stored in the network key table. Consequently, it is sufficient to update the network key table only in a case where the necessity for the update occurs. Thus, the processing load on the content providing server can be alleviated.

Furthermore, in a case where there is a limit to memory capacity of the network key table for storing plural network keys, a key to delete is selected according to certain selection criteria. For instance, the oldest key is selected. Alternatively, in a case that the load on the operation of changing a key has a minimum value, this key is selected. Then, an operation of changing an encrypted content key, to which the key to delete is applied, is performed, and the updated network key is stored in the table. Thus, even in a case where the capacity of the key table in the server is small, a reliable operation can be performed.

BRIEF DESCRIPTION OF THE DRAWINGS

The above and other objects and features of a preferred embodiment of the present invention will become more readily apparent to those of ordinary skill in the art from the following detailed description taken in conjunction with the accompanying drawings in which:

FIG. 6 is a table explaining the configuration of the home network key table;

FIG. 11 is a table explaining an example of the data configuration of a home network key table to which an encrypted content key is applied;

DETAILED DESCRIPTION OF THE PREFERRED EMBODIMENTS OF THE PRESENT INVENTION

Hereinafter, the details of an information processing apparatus, a content information management method, and a computer program of the present invention are described by referring to the accompanying drawings.

Figure 1:
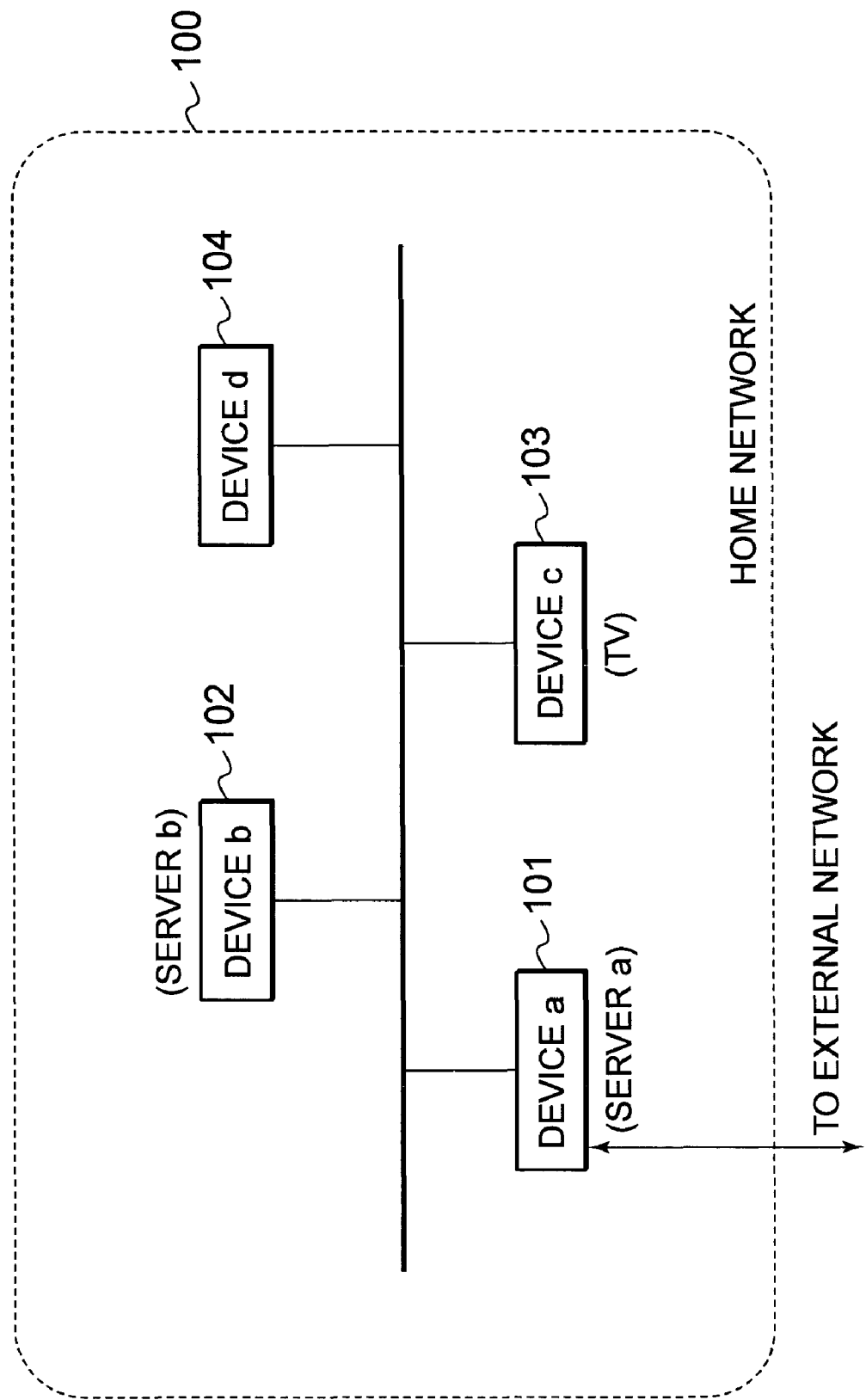
FIG. 1 is a view explaining an example of a network configuration of a home network to which the present invention can be applied.

FIG. 1 shows a schematic example of a home network. To this network 100, 4 devices are connected. Among the devices, the device a 101 and the device b 102 are content servers and store content. Among the device a 101, the device b 102, the device c 103, and the device d 104, data communication can be performed through the network, which is configured so that any of the devices can obtain the content stored in the content server and can reproduce and utilize the content.

Figure 2:
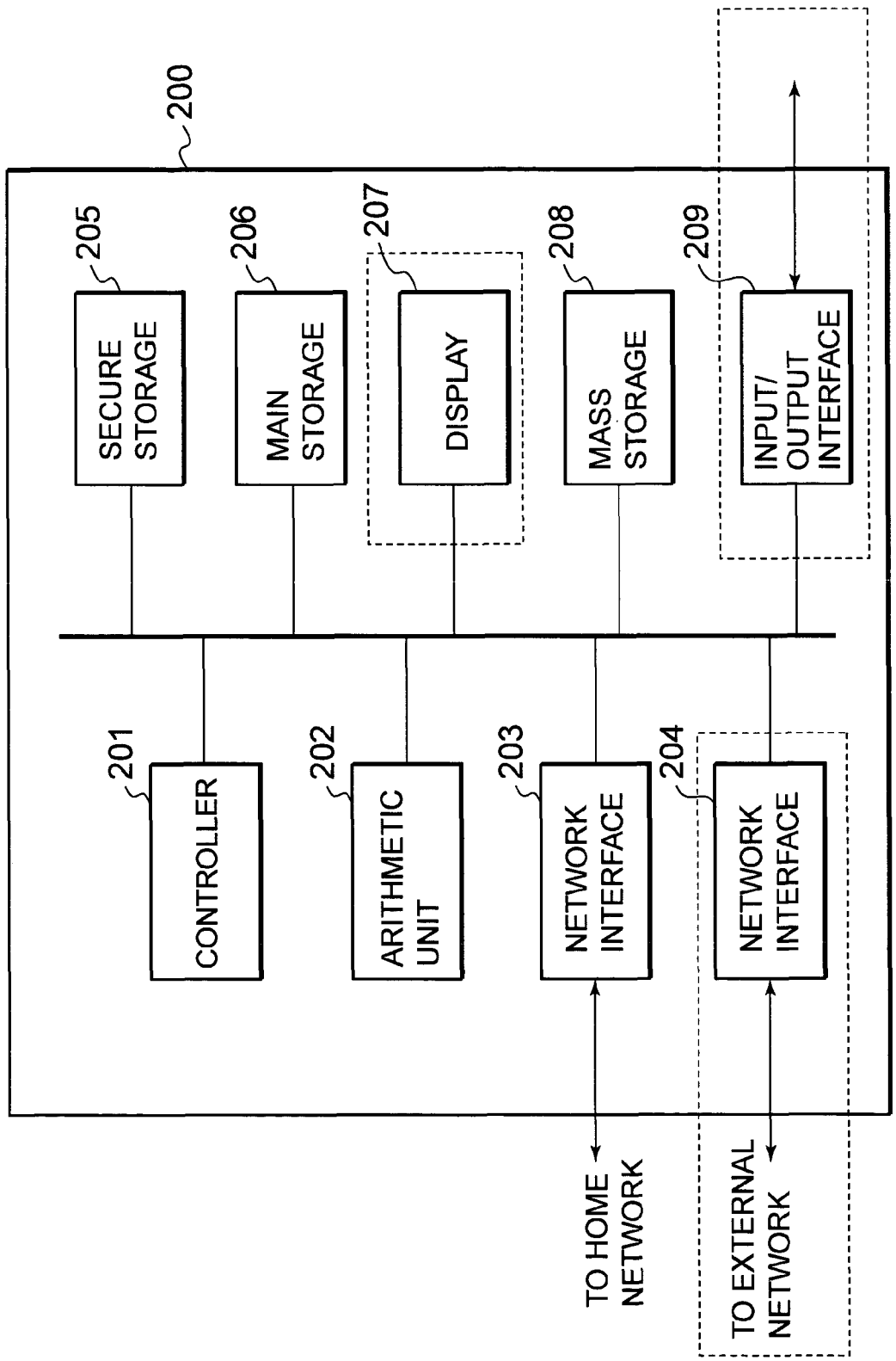
FIG. 2 is a view explaining an example of the configuration of an information processing apparatus constituting a server for storing content.

FIG. 2 shows an example of the configuration of an information processing apparatus constituting the content server. A network interface 204, a display 207, and an input/output interface 209 shown in frames indicated by dashed lines are optional and not elements to be always provided therein.

As shown in FIG. 2, an example of the configuration of the information processing apparatus 200 constituting the content server has a controller 201, an arithmetic unit 202, a network interface 203, the network interface 204, a secure storage 205, a main storage 206, the display 207, a mass storage 208 and the input/output interface 209.

The controller 201 is constituted by a CPU serving as a controller for performing data processing according to a computer program. The arithmetic unit 202 provides computing functions dedicated to generation of an encryption key, random number generation, and encryption. The network interface 203 is connected to a local area network, such as a home network, and applied to communication processing between devices connected to the local area networks. The network interface 204 is connected to an external network, such as the Internet and a dedicated line, and applied to the communication processing performed with devices connected to the external network.

The secure storage 205 is a storage for storing data to be held safely or secretly, for example, an encryption key and various kinds of IDs, and serves as an area for storing a home network key established in the home network, that is, an area for storing a home network key table (to be described later) Further, the secure storage 205 stores a key peculiar to the server or the network, a key for a security system used in the external network, for example, a key for decrypting encrypted content or an encrypted content key, and the like.

The main storage 206 is a memory area used for storing, for instance, a data processing program executed in the controller 201, and a work area for storing a temporary storage processing parameter. The secure storage 205 and the main storage 206 are memories constituted by, for example, a RAM or a ROM.

The display 207 is a display constituted by an LCD or the like, which is used for outputting, for example, content. The mass storage 208 is constituted by, for instance, a hard disc and used as a storage area for storing content or the like. Concretely, content data encrypted by a content key and a content data encrypted by a home network key are stored therein. The input/output interface 209 is an interface corresponding to data input from input means, such as a keyboard and a mouse, and to data output to an output section externally connected to a display, a speaker and the like.

By the way, a server according to the present invention stores a home network key table in the secure storage 205, as above-mentioned. The details of the home network key table are described later.

By the way, in the figure, the secure storage 205, the main storage 206, and the mass storage 208 are shown as independent constituents. However, these storages may be present independently as hardware constituents. Alternatively, these storages may be made as a single hardware constituent. For example, a part of the mass storage may be set to be the secure storage by employing encryption techniques to thereby make this part to be safer.

By the way, the configuration of network-connected devices other than the server is almost similar to that of the information processing apparatus shown in FIG. 2. Concrete examples of the network-connected devices are PCs, television sets, video equipment, DVD reproducers, and portable communication terminals. Each of these devices includes a networkable interface and various units having information processing functions corresponding thereto, and has a configuration enabled to communicate with the other network-connected devices. By the way, the configuration of each of the devices corresponds to the processing functions thereof. Thus, some devices do not have, for instance, a mass storage.

In the network configuration shown in FIG. 1, the device a 101, the device b 102, the device c 103, and the device d 104 share a home network key [HKt1] as key information for utilizing encrypted content stored in the device a 101 and the device b 102 serving as servers.

The home network key [HKt1] is a home network key functioning at a time t1. The home network key is updated as occasion demands. Hereinafter, the home network key at a time tn is designated by "[HKtn]".

Figure 3:
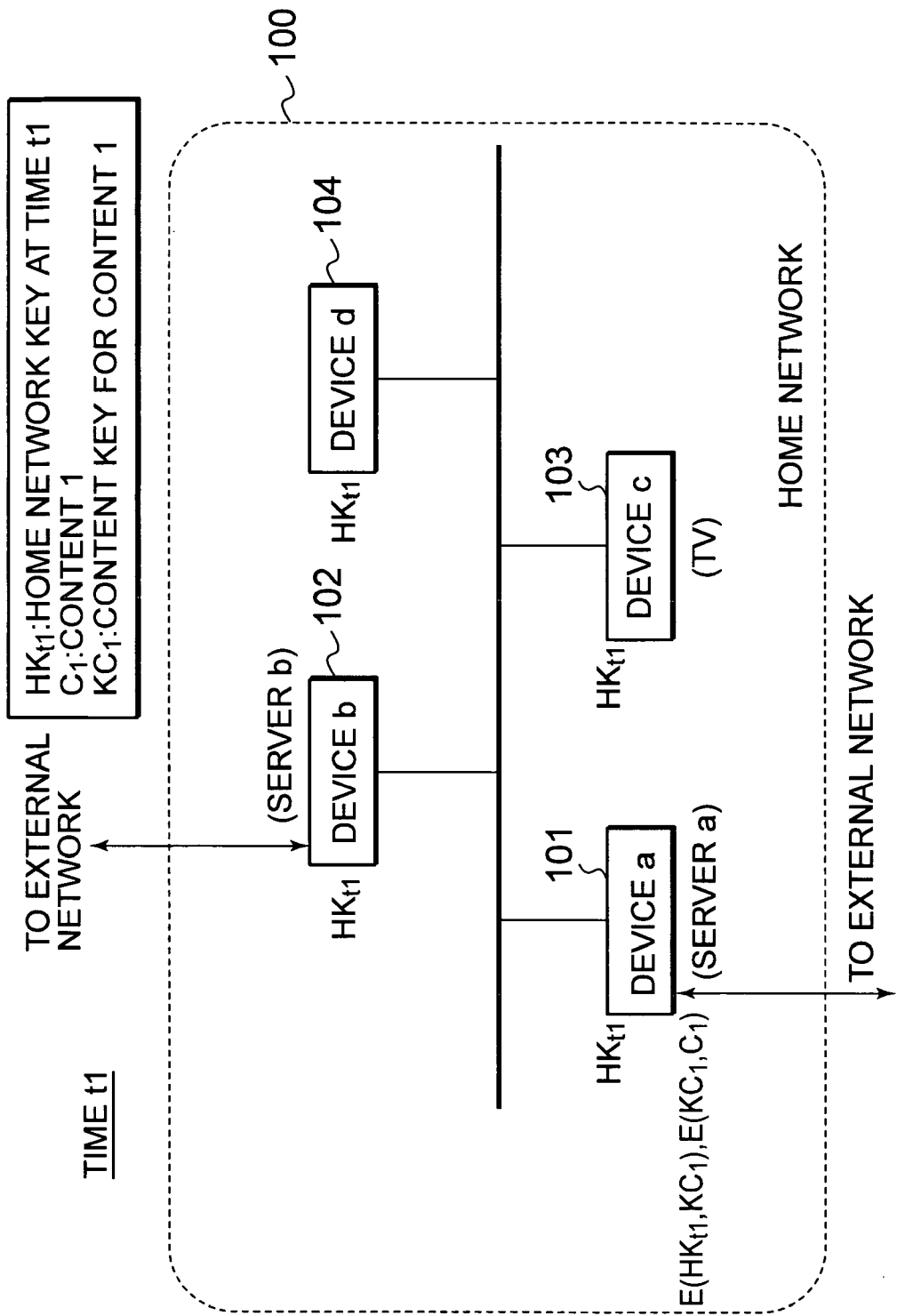
FIG. 3 is a view explaining an example of application of a home network key.

FIG. 3 shows information owned by the devices in the home network at the time t1. The devices in the network share the home network key [HKt1] at this moment (t1).

The sharing of the home network key is performed by an information distribution method maintaining, for example, security. For instance, a tree-type key distribution method disclosed in Japanese Patent Application Publication Laid-Open No. 2002-63763 (Japanese Patent Application No. 2000-391976 already filed by the Applicant of the present application) can be applied thereto.

In a case where the tree-type key distribution method disclosed in the Japanese Patent Application Publication Laid-Open No. 2002-63763 (the Japanese Patent Application No. 2000-391976) is applied thereto, the method may be constructed by the following steps. In other words, a secret key, such as a root key set at a top node of a tree, is safely distributed to the network-connected devices. Then, data processing is performed on data, which is obtained by combining this distributed root key with, for instance, numbering data used as identification information of the home network and time information, in the devices. Thus, the home network key at that time is shared by the devices. According to the tree-type key distribution method, only authentic devices can safely share the home network key. The home network key is updated every predetermined number of hours, for example, every month, or when the equipment configuration of the home network is changed.

In a case when the home network key is updated in the server a 101, an updated home network key [HKt2] or information needed for generation of the updated home network key [HKt2] is distributed to each of the network-connected devices according to the tree-type key distribution method.

Each of the network-connected devices having received the information causes the storage thereof to store the received home network key [HKt2] or a home network key [HKt2] generated according to information needed for generating an updated home network key [HKt2].

An outline of the general update of a home network key and the sharing thereof by the network-connected devices is described by referring to FIG. 3.

It is now assumed that content 1 is taken into the server a 101 from the exterior of the home network 100, for instance, from an external network or package media. The server a 101 stores the content 1, which is taken from the exterior, in the storage thereof.

In a case where the content 1 [C1] taken from the exterior is stored in the external network or the package media in a state in which the content 1 is encrypted by the content key, and where the encryption format thereof is a format that can be utilized in the home network, the content 1 [C1] is stored in the storage of the server a 101 without changing the encryption format. Further, the server a 101 encrypts the content key, which is applied as an encryption key for the content, by a current home network key at that time (t1), that is, the latest home network key [HKt1] and then stores the encrypted content key in the mass storage.

In a case where the content 1 [C1] taken from the exterior is non-encrypted data or encrypted in a format differing from an encryption format that can be utilized in the home network 100, the server a 100 converts the content 1 [C1] to content encrypted in an encryption format, which can be utilized in the home network 100, and encrypts the converted content 1 by the content key and stores the encrypted content in the mass storage. By the way, further, the server a 101 encrypts the content key, which is applied as the encryption key for the content, by the current home network key at that time (t1), that is, by the latest home network key [HKt1] and stores the encrypted content key in the mass storage.

As shown in FIG. 3, the server a 101 stores encrypted content E (KC1, C1), which is obtained by encrypting the content 1 [C1] by the content key 1 [KC1], and an encrypted content key E (HKt1, KC1), which is obtained by encrypting the content key 1 [KC1] by the current home network key at that time (t1), that is, the latest home network key [HKt1], in the storage of the server a 101. By the way, the expression "E (A, B)" designates encrypted data, which is obtained by encrypting data B by a key A.

Figure 4:
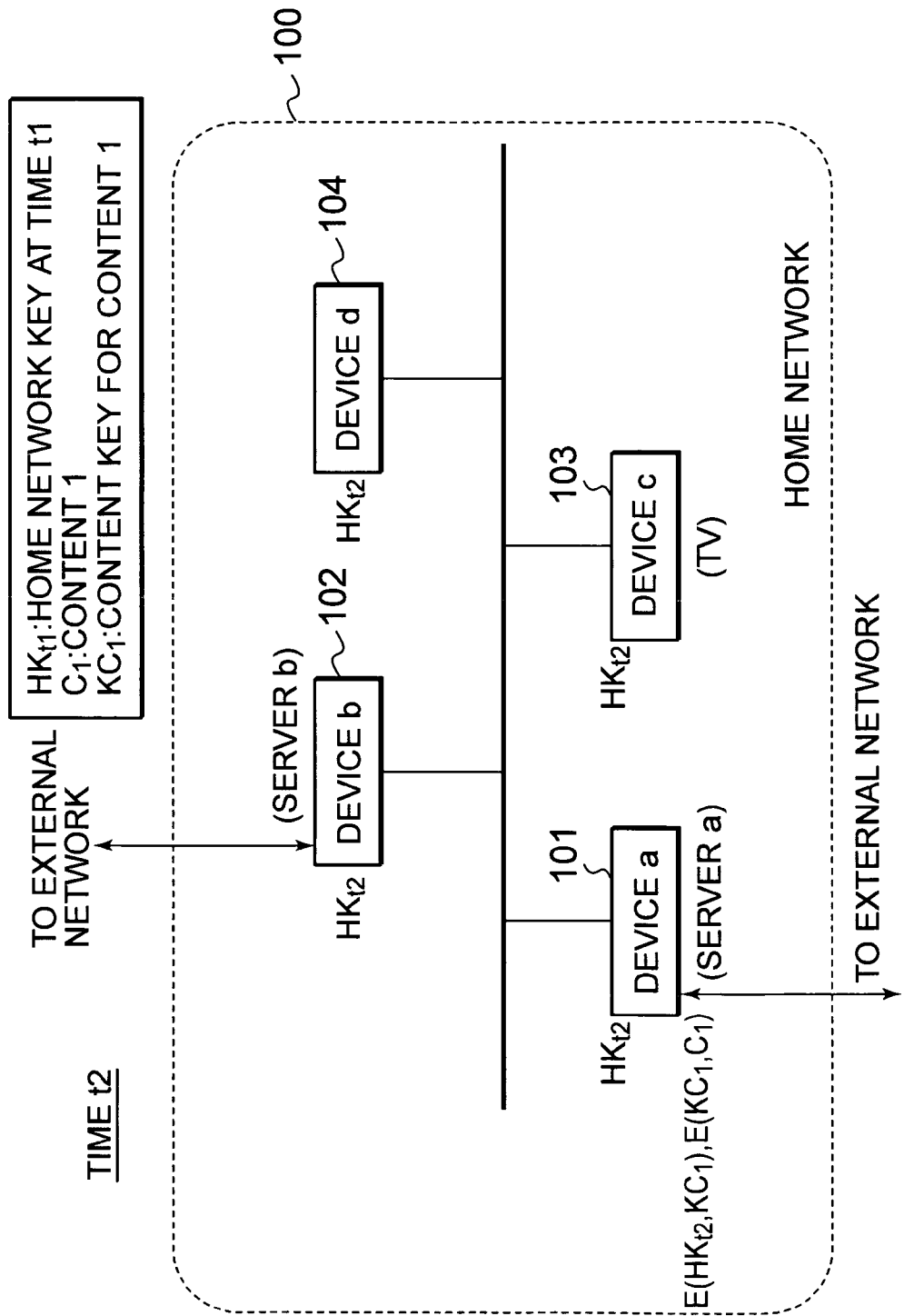
FIG. 4 is a view explaining the general key updating of a home network key.

Hereunder, a general process to be performed in a case of subsequently updating the home network key at a time t2 to a home network key [HKt2] is described by referring to FIG. 4. The server a 101 performs notification of updated home network key or information needed for updating the home network key to the network-connected devices, and sets a state, in which the updated home network key [HKt2] is shared by the network-connected devices, in each of the network-connected devices. Moreover, the server a 101 decrypts all the content keys stored therein once. Thereafter, the content keys are reencrypted by the current updated home network key [HKt2], that is, an operation of changing the key is performed, so that the reencrypted content keys are stored in the mass storage.

The process performed by the server a 101 is as follows.
(1) This server decrypts the encrypted content key E (HKt1, KC1) by using a pre-update home network key [HKt1] and obtains the content key [KC1].
(2) This server encrypts the content key [KC1] by using the updated home network key [HKt2] to thereby generate encrypted content key E (HKt2, KC1) and to store the generated content key E (HKt2, KC1).

In a case where the server has plural encrypted content stored therein and where the server also has content keys [KC1] to [KCn] corresponding to the encrypted content, it is necessary to repeat the processes (1) and (2) n times corresponding to the number n of the content. An amount of the processes increases with increase in the number of the stored content. This results in occurrence of a large processing load in a case where the server has a mass storage in which various kinds of content are stored.

Hereinafter, an example of the configuration of the present invention, which reduces the load of updating the home network key, is described.

Figure 5:
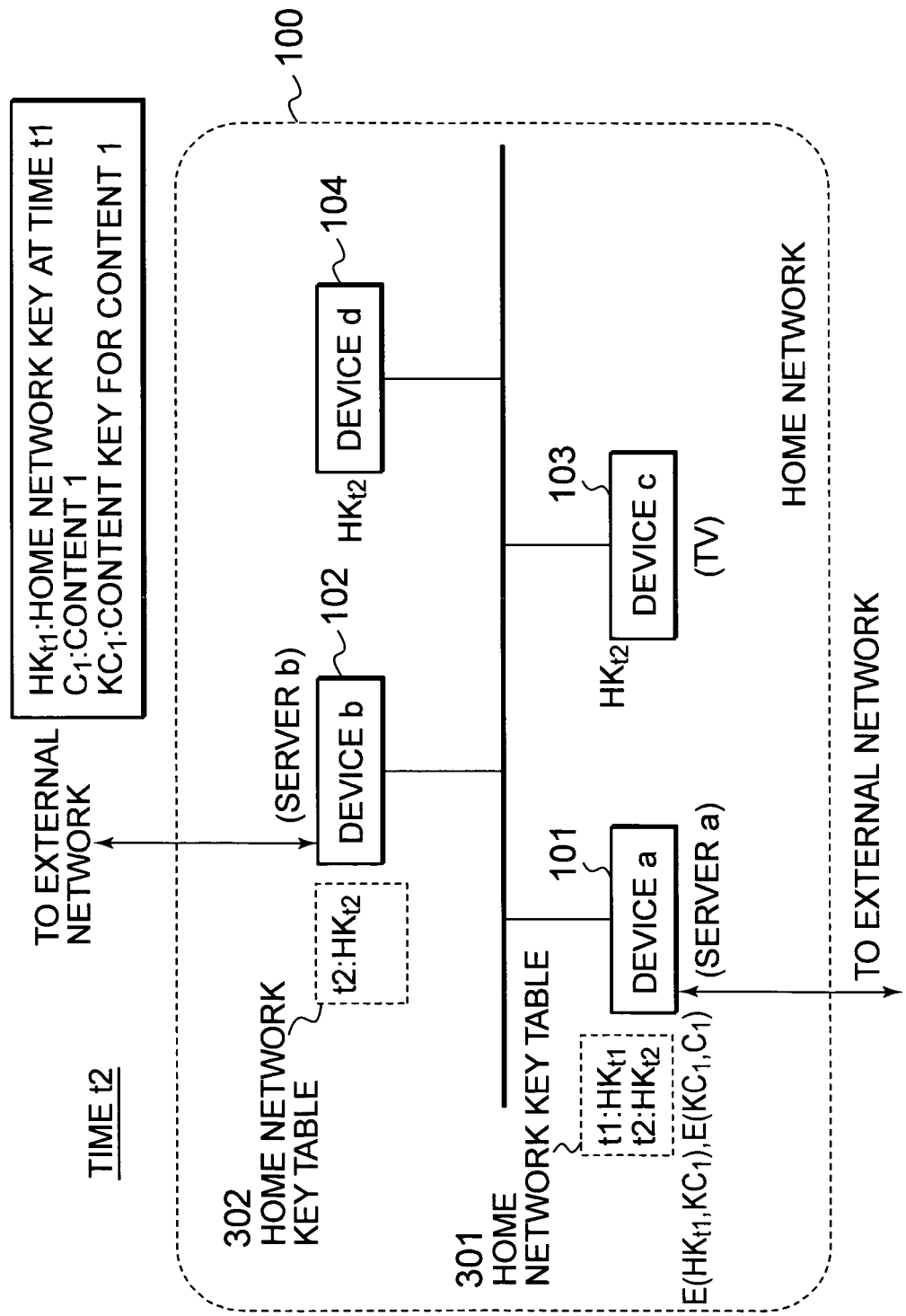
FIG. 5 is a view explaining the configuration for utilizing a home network key, which uses a home network key table according to the present invention.

The processing configuration according to a preferred embodiment of the present invention is described by referring to FIG. 5 and the following figures. FIG. 5 is a view explaining data held by each of the devices connected to the home network at the time t2.

At the time t2, the server a 101 updates the home network key to a home network key [HKt2] due to, for example, the advent of periodical update timing. The server a 101 performs the notification of the updated home network key or information needed for updating the home network key to the network-connected devices, and sets a state, in which the updated home network key [HKt2] is shared by the network-connected devices, in each of the network-connected devices.

The server a 101 does not reencrypt the content key, which is the encryption key for the content stored therein, by the updated home network key [HKt2]. The server a 101 holds the encrypted content key E (HKt1, KC1), which is encrypted by the pre-update home network key [HKt1], without change.

The server a 101 stores a home network key table 301 in the storage thereof, and stores the home network key HKt1, by which the content key stored therein is encrypted, in this table.

As shown in FIG. 6, the home network key table is a table for storing data representing the corresponding relation between the update time [tn] and the home network key [HKtn] updated at the update time.

The server b 102 also stores a home network key table in the storage thereof and does not hold the content at a current moment. Thus, the server b 102 holds only the current home network key HKt2 in a home network key table 302.

The server holding the content has the home network key table. However, in the home network key table, only the latest updated home network key and the home network keys, which are actually applied to the encryption of the content keys held by the server, are stored. By the way, as will be described later, in the configuration having a current home network key memory, the latest updated home network key is once stored in the current home network key memory. In a case where the latest updated home network key is applied as an encryption key for the encrypted content, the latest updated home network key is moved from the current home network key memory to the home network key table and stored in the home network key table. This configuration will be described later.

The configuration shown in FIG. 5 is an embodiment that does not have the current home network key memory. In this case, as shown in FIG. 5, the server a 101 stores the latest updated home network key [HKt2] at the time t2 and the pre-update home net work key [HKt1], by which the content key stored therein is encrypted, in the home network key table 301. In the case of the server b 102, there is no home network key used for encrypting the content key stored therein. Thus, the server b 102 stores only the latest updated home network key [HKt2] at the time t2 in the home network key table 302.

Figure 7:
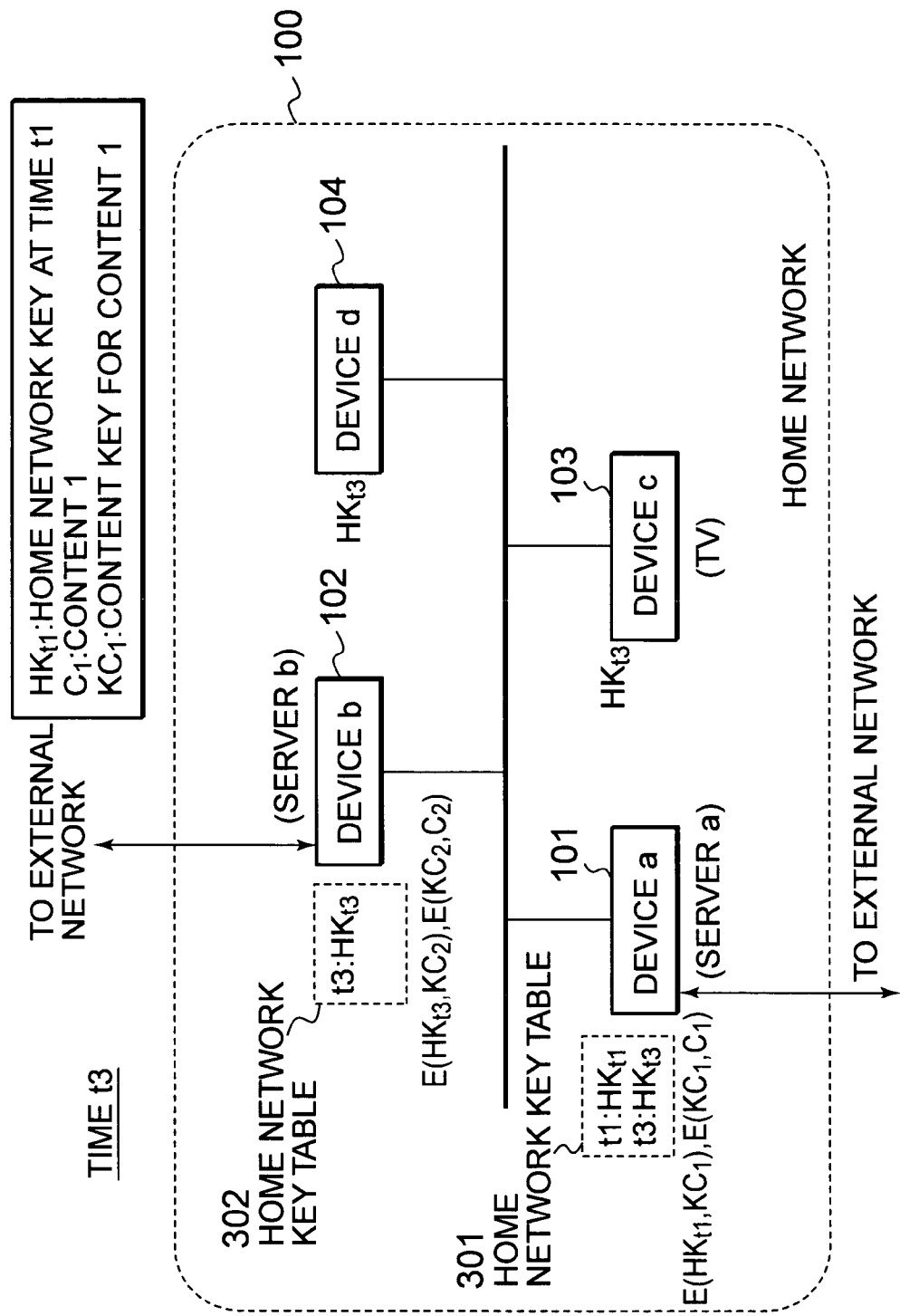
FIG. 7 is a view explaining the configuration for utilizing a home network key (time=t3), which uses a home network key table according to the present invention.

FIG. 7 shows a manner at a time [t3] after the lapse of time. At this moment [t3], the network-connected devices share the home network key HKt3. By the way, it is assumed herein that the server b 102 receives content 2 [C2] thereto from the exterior thereof, for example, through an external network, or through storage media, such as a CD and a DVD. The server b 102 generates encrypted content E (KC2, C2) as encryption data obtained by applying the content key 2[KC2] to the received content [C2], and stores the generated data in the storage thereof. Further, the server b 102 encrypts the content key 2 [KC2] by the latest home network key [HKt3] at the moment, at which this content is inputted thereto, to thereby generate an encrypted content key E(HKt3, KC2) and store this content key in the storage thereof.

FIG. 7 shows a manner at a time [t4] after time has elapsed still further. At this moment [t4], the network-connected devices share the updated home network key [HKt4].

By the way, it is assumed herein that the server a 101 receives content 3 [C3] thereto from the exterior thereof, for example, through an external network, or through storage media, such as a CD and a DVD. The server a 101 generates encrypted content E(KC3, C3) as encryption data obtained by applying the content key 3 [KC3] to the received content [C3], and stores the generated data in the storage thereof. Further, the server a 101 encrypts the content key 3 [KC3] by the latest home network key [HKt4] at the moment, at which this content is inputted thereto, to thereby generate an encrypted content key E(HKt4, KC3) and store this content key in the storage thereof.

It is assumed that at the time t4 or later, in a state in which the home network key [HKt4] is shared by the devices as the latest home network key, the device c 103 utilizes the content 3 [C3], which is owned by the server a 101. For example, the content 3 [C3], which is a movie, is displayed in the device c 103, which is a television set.

Figure 9:
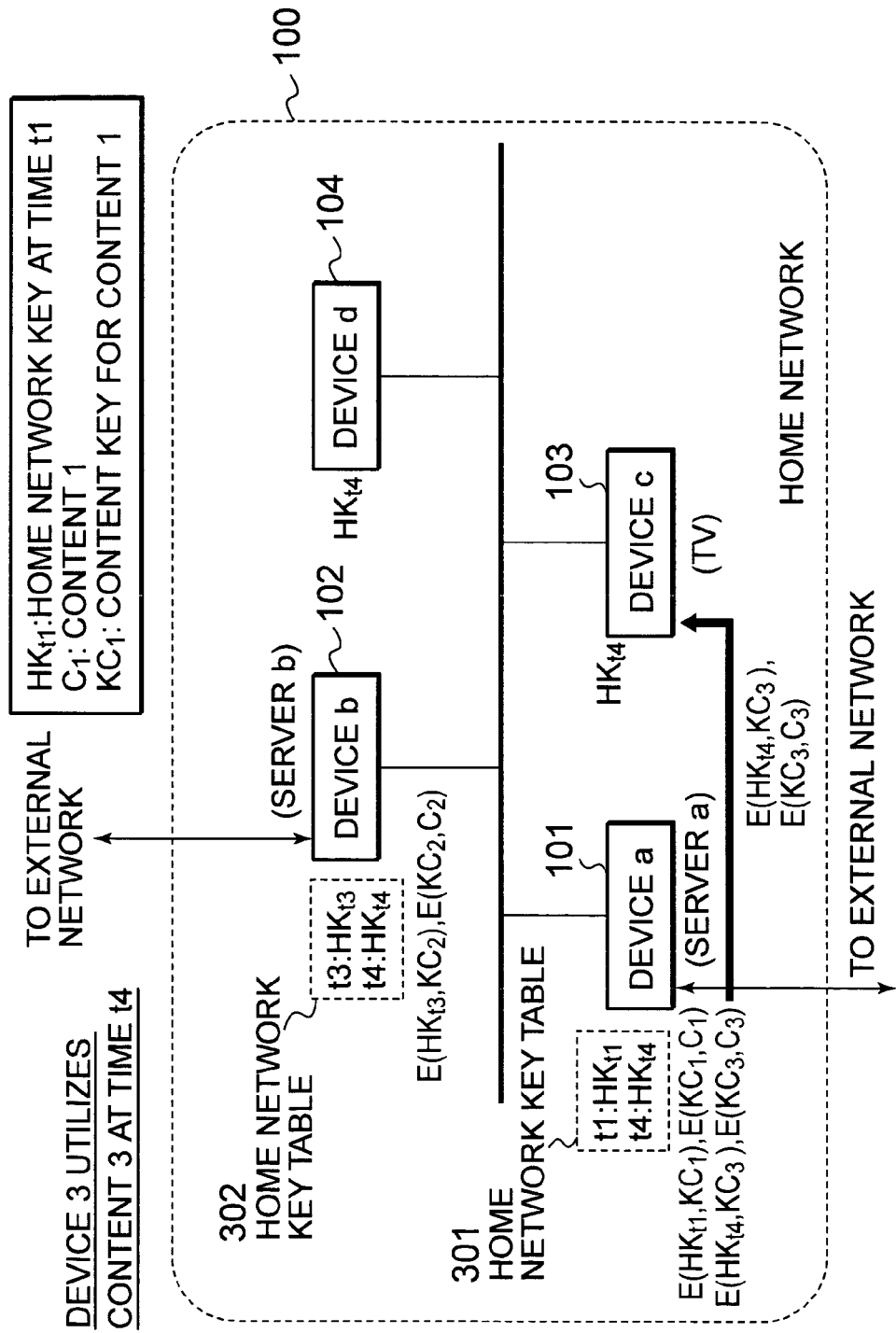
FIG. 9 is a view explaining processing to be performed during content is utilized in the configuration for utilizing a home network key (time=t4), which uses a home network key table according to the present invention.

This process is described by referring to FIG. 9. At that time, the content 3 [C3] stored in the server a 101 is encrypted by the content key 3 [KC3]. Furthermore, the content key 3 [KC3] is encrypted by the latest updated home network key [HKt4]. The server a 101 sends the two encrypted data, that is, the encrypted content key E(HKt4, KC3) and the encrypted content (KC3, C3) to the device c 103. The device c 103 has a current home network key HKt4, similarly as the device a 101. Thus, the device c 103 decrypts the encrypted content key by using this current home network key HKt4, and obtains the content key. The device c 103 can utilize the content by applying the content key thereto thereby to decrypt the encrypted content. In other words, the process performed by the server a 101 is as follows.

(1) This device decrypts the encrypted content key E (HKt4, KC3) by applying a home network key [HKt4] thereto and obtains the content key KC3.

(2) This device decrypts the encrypted content (KC3, C3) by applying the content key [KC3] thereto and obtains the content.

Figure 10:
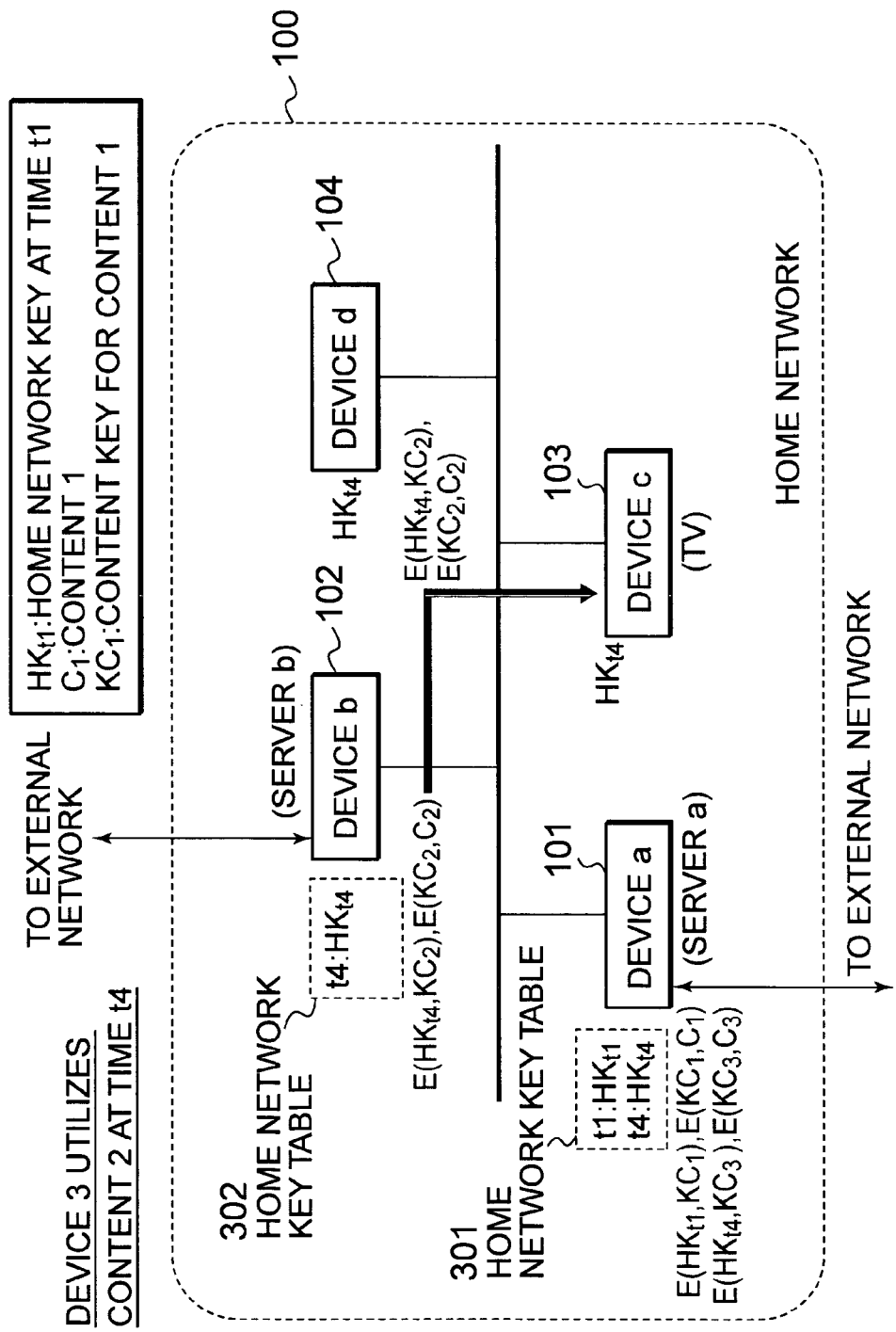
FIG. 10 is a view explaining processing to be performed during content is utilized in the configuration for utilizing a home network key (time=t4), which uses a home network key table according to the present invention.

The process at the time of utilizing the content 2 [C2], which is owned by the server b 102, by the device c 103 similarly at the time t4 or later, in a state in which the home network key [HKt4] is shared by the devices as the latest home network key, is described by referring to FIG. 10.

At that time, the content 2 [C2] is encrypted by the content key 2 [KC2] on the server b 102. The content key 2 [KC2] is encrypted by the pre-update home network key [HKt3] at the time t3, instead of the latest current updated home network key [HKt4]. In other words, the content key 2 is in a state in which this key is held as the encrypted content key E (HKt3, KC2).

When the server b 102 receives from the device c 103 a request for acquiring the content 2 [C2] through the network, the server b 102 judges whether the content key associated with the content 2 [C2] is encrypted by the current latest updated home network key [HKt4] or by the pre-update home network key. If this server judges that this content is encrypted by the pre-update home network key, this server reads the home network key table 302, which stores the home network key applied to the encrypted content keys, from the storage of the server b 102. Thus, this server obtains the home network key at the time t3, which is applied as an encryption key for encrypting the content key associated with the content 2 [C2] and stored in the home network key table 302.

Further, this server obtains the content key 2 [KC2] by applying the home net work key [HKt3] obtained from the home network key table 302 thereto. This server encrypts this content key by using the current home network key [HKt4], and then stored this encrypted key in the pass storage thereof again. Also, this server sends this encrypted content key and the encrypted content to the device c 103.

In other words, the server b 102 performs the following process.

(1) This server obtains the home network key [HKt3] from the home network key table.
(2) This server decrypts the encrypted content key E (HKt3, KC2) by applying the home network key [HKt3] to thereby obtain the content key [KC2].
(3) This server obtains the latest updated home network key [HKt4] from the home network key table.
(4) This server encrypts the content key KC2 by applying the updated home network key [HKt4] thereto to thereby generate the encrypted content key E (HKt4, KC2) and stores this content key in the storage thereof.
(5) This server sends the generated and encrypted content key E (HKt4, KC2) and the encrypted content E (KC2, C2) to the device c 103.

The device c 103 can utilize the content 2 [C2], entirely similarly to the case of utilizing the content 3 [C3] of the server a 101. In other words, the process of utilizing the content 2 [C2] of the device c 103 is as follows.

(1) This device decrypts the encrypted content key E (HKt4, KC2) by applying the home network key [HKt4] thereto, and obtains the content key [KC2].
(2) This device decrypts the encrypted content (KC2, C2) by applying the content key [KC2] thereto, and obtains the content 2 [C2].

By the way, the server for registering and holding plural home network keys in the home network key table may be configured in such a way as to hold correspondence data for indicating what content key is encrypted and what moment is employed as the time, the associated home network key of which is used for encrypting the content key.

For example, as shown in FIG. 11, an encrypted content key application home network key table, from which the server can obtain both the content key data encrypted by the home network key and encrypted-content-key application home network key information associated with update time information that relates to the home network key used for the encryption and that indicates t4 when, for example, the home network key [HKt4] is applied, may be configured. The server may be configured so that this table is stored in the storage thereof. Alternatively, identification information, such as version information on the versions of the individual home network keys, may be stored therein.

Figure 8:
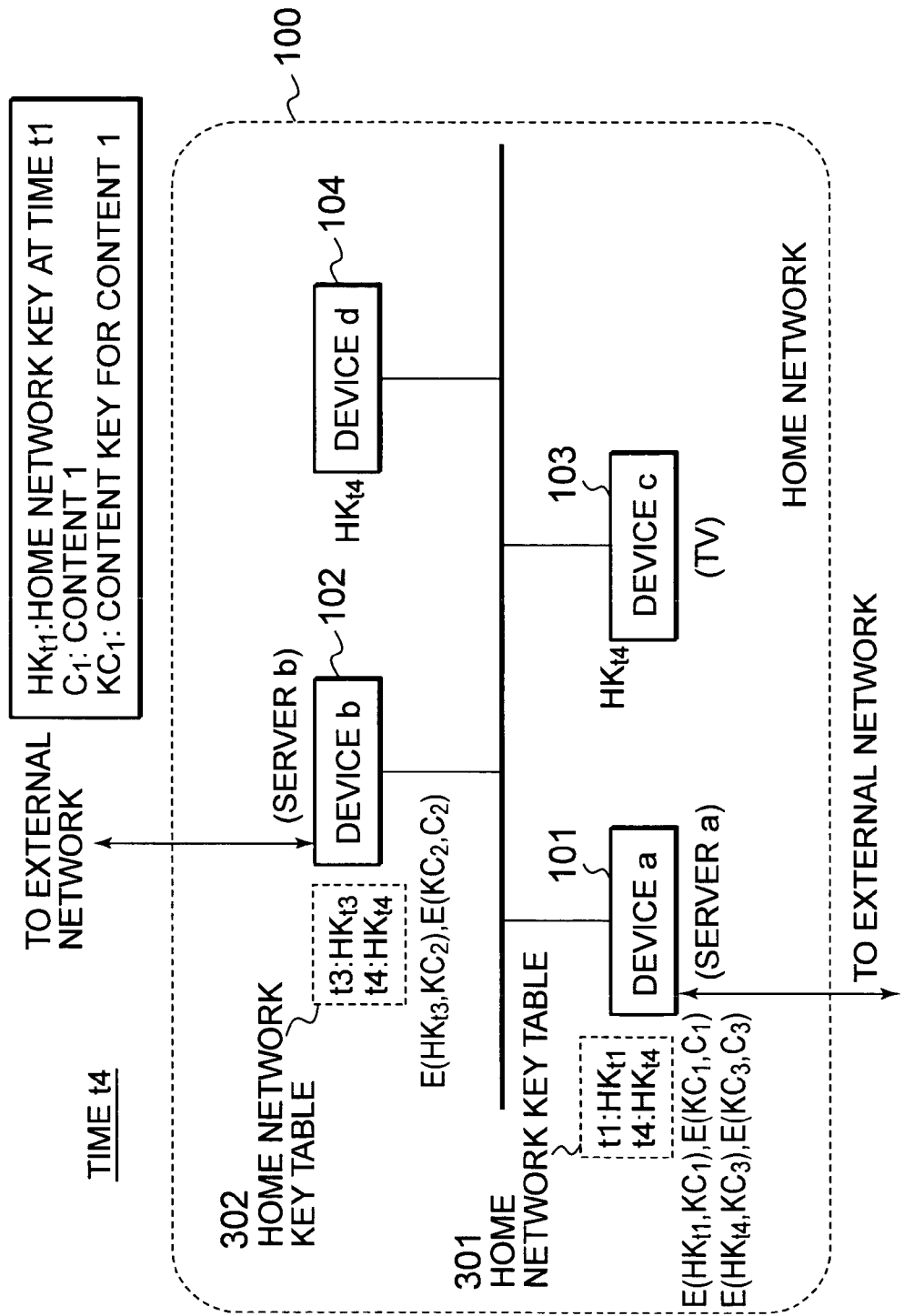
FIG. 8 is a view explaining the configuration for utilizing a home network key (time=t4), which uses a home network key table according to the present invention.

Meanwhile, at the time t4 shown in FIG. 8, the server a 101 holds content keys E(HKt1, KC1) and E(HKt4, KC3) encrypted by using the home network keys [HKt1] and [HKt4].

Therefore, the server a 101 holds plural home network keys [HKt1] and [HKt4] in the home network key table 301.

By the way, a home network key storage region, in which the server a 101 stores the key information, in the storage, that is, the secure storage thereof may have capacity in which only two home network key data can be stored.

Figure 12:
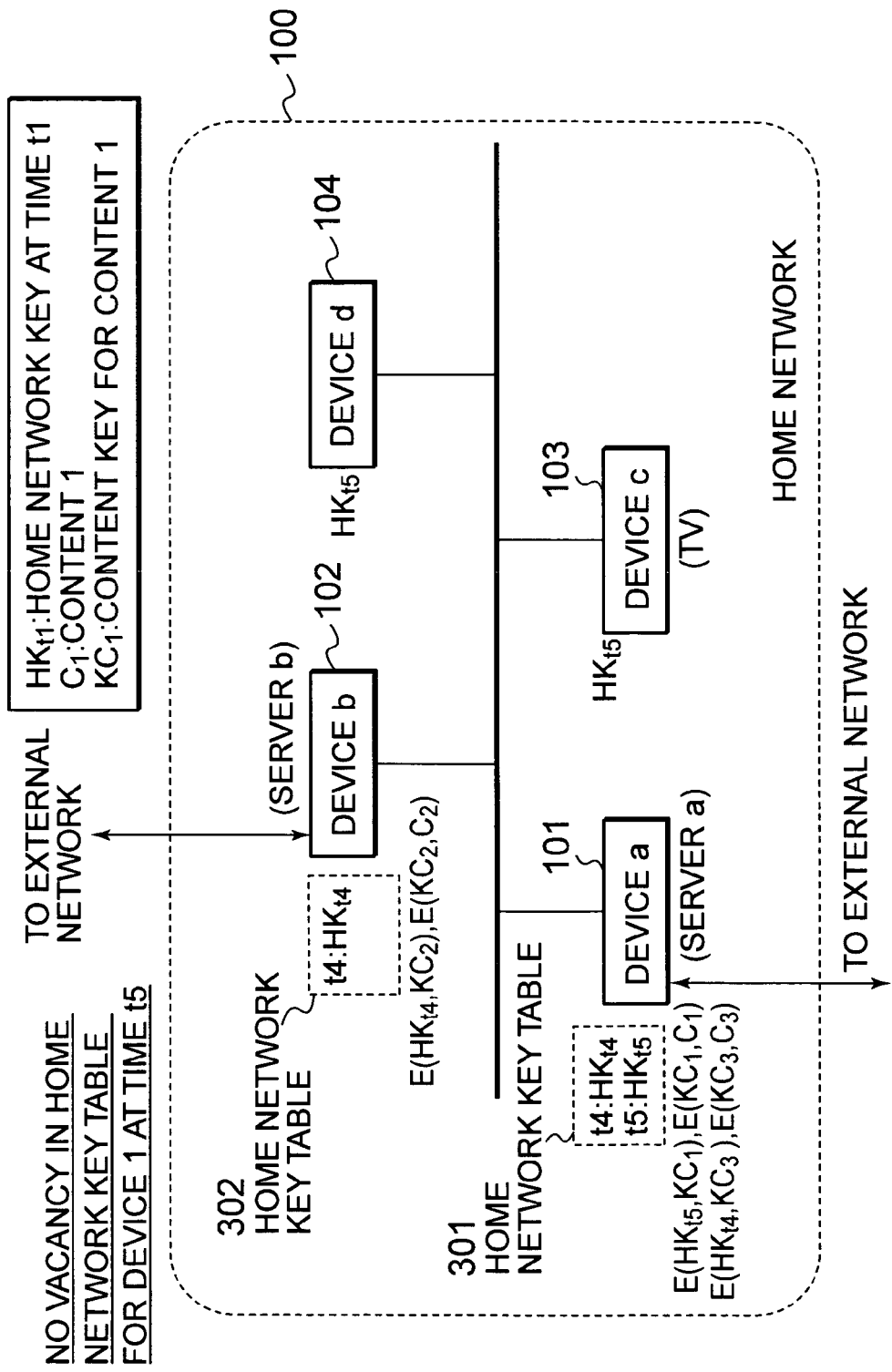
FIG. 12 is a view explaining processing to be performed in a case where there is no vacancy in the home network key table in the configuration for utilizing a home network key (time=t5), which uses a home network key table according to the present invention.

A process, which is performed by the server a 101 when time advances to a moment [t5], is described by referring to FIG. 12. At the moment [t5], the network-connected devices share the home network key [HKt5] by performing home network key updating.

The server a 101 should store the latest updated home network key [HKt5] in the secure storage thereof. However, in the home network key storage region of the secure storage, that is, in the home network key table, the two home network keys [HKt1] and [HKt4], the number of which is the upper limit associated with the capacity, has already been stored.

In this case, it is necessary for the server a 101 to set a region, which stores the updated home network key [HKt5] in the home network key table 301, and to store the updated home network key [HKt5] therein.

The server a 101 extracts and deletes the oldest home network key from the home network keys stored in the home network key table 301, and stores the updated home network key [HKt5] therein.

In this case, the home network key to delete is the oldest home network key HKt1, so that the home network key [HKt1] is deleted. However, the server a 101 has the content key 1 [KC1] encrypted by the home network key [HKt1] to delete. In other words, the server a 101 has the encrypted content key E (HKt1, KC1).

The server a 101 decrypts the encrypted content key E (HKt1, KC1) and encrypts the decrypted content key by applying the updated home network key [HKt5] thereto, and stores the encrypted key in the storage thereof. A process performed by the server a 101 is as follows.

(1) This server obtains the content key [KC1] by decrypting the encrypted content key E (HKt1, KC1).
(2) This server encrypts the content key [KC1] by applying the updated home network key [HKt5] thereto, and stores the encrypted content key E (HK5, KC1) in the storage thereof.
(3) This server deletes the home network key [HKt1] from the home network key table and stores the updated home network key [HKt1] therein.

With the above process, the server a 101 maintains a state where all the home network keys, which are applied to the encrypted content keys stored therein, and the latest updated home network keys are registered and stored in the home network key table 301.

By the way, in the foregoing description of the example, an example, in which the oldest home network key among those stored in the home network key table is set as the criteria for selecting the home network key to delete from the home network key table, has been described. However, the device may be configured so that other criteria are applied thereto.

For example, the device may be configured so that among the home network keys stored in the home network key table, the key, the deletion of which least affects the device, is selected as an object to delete. In other words, a home network key is selected as an object to delete so that the number of the encrypted content keys encrypted by using this home network key and stored therein is smallest.

Further, in the above-mentioned embodiment, only one of the home network keys is deleted from the home network key table 301 provided on the server a 101 at the time t5, and a current updated home network key is stored therein. However, it is unknown whether or not the content associated with the encrypted content key, on which the operation of changing the key is performed, is necessarily utilized until the home network key is updated next time. If not utilized, the operation of changing the key is wasteful.

For instance, in the above-mentioned example, the following process is performed. In other words, (1) The server obtains the content key 1 [KC1] by decrypting the encrypted content key E (HKt1, KC1).

(2) This server encrypts the content key 1 [KC1] by applying the updated home network key [HKt5] thereto, and stores the encrypted content key E (HKt5, KC1) in the storage thereof.

(3) The home network key [HKt1] is deleted from the home network key table, so that the updated home network key [HKt5] is stored therein.

It is unknown whether or not the content 1 [C1] encrypted by the content key [KC1], which is included in the encrypted content key E (HKt1, KC1), is necessarily utilized until the home network key is updated next time. If not utilized, the operation of changing the key is wasteful.

To prevent a wasteful process from being performed, a current home network key memory serving as a secure storage, which can temporarily be used, may be provided in the server for storing the content. The server may be configured so that the latest updated home network key is stored this memory.

The above-mentioned processes, that is, the process of changing the key by the latest updated home network key for the encrypted content key, the process of deleting the home network key from the home network key table, and the process of storing the updated home network key are performed only when the server takes in new content or utilizes the content stored therein to thereby cause the necessity for storing the current home network key at that time in the home network key table.

The concrete example of the above-mentioned processes is described by referring to the drawings. The process performed in a case where time advances from the time t4 to the time t5, which is shown in FIG. 8, is described by referring to FIG. 13.

When time advances to t5, the devices connected to the home network share the latest updated home network key [HKt5]. In the server a 101 and the server b 102, this latest updated home network key [HKt5] is stored in the current home network memories 351 and 352 provided as temporary secure storages in the servers. In the home network key tables 301 and 302 of the server a 101 and the server b 102, only the home network keys, which are applied to the encryption of the encrypted content key actually used for encrypting the content key and stored in the storages of the servers, are registered and stored.

In a case where the content 1 [C1] or the content 3 [C3] stored in the server a 101 in is utilized by the network-connected devices a period, in which the home network key [HKt5] is effective as the latest home network key in this state, the server a 101 obtains the home network key [Hkt1] or [HKt4] for encryption content key, that is, E (HKt1, KC1) or E (HKt4, KC3) for the content keys [kC1] and [KC3] associated with the content 1 [C1] or the content 3 [C3]. Then, this server performs decryption thereof. Subsequently, the server encrypts the decrypted content key by the latest updated home network key [HKt5], and stores the encrypted key in the storage thereof.

In other words, the content keys E (HKt5, KC1) and E (HKt5, KC3) are generated and stored in the storage of the server a 101. Upon completion of this process, the server a 101 deletes the home network keys [HKt1] and [HKt4], which become unnecessary, from the home network key table 301, and moves the latest updated home network key [HKt5] from the current home network key memory 351 and stores the latest updated home network key [HKt5] in the home network key table 301.

Figure 14:
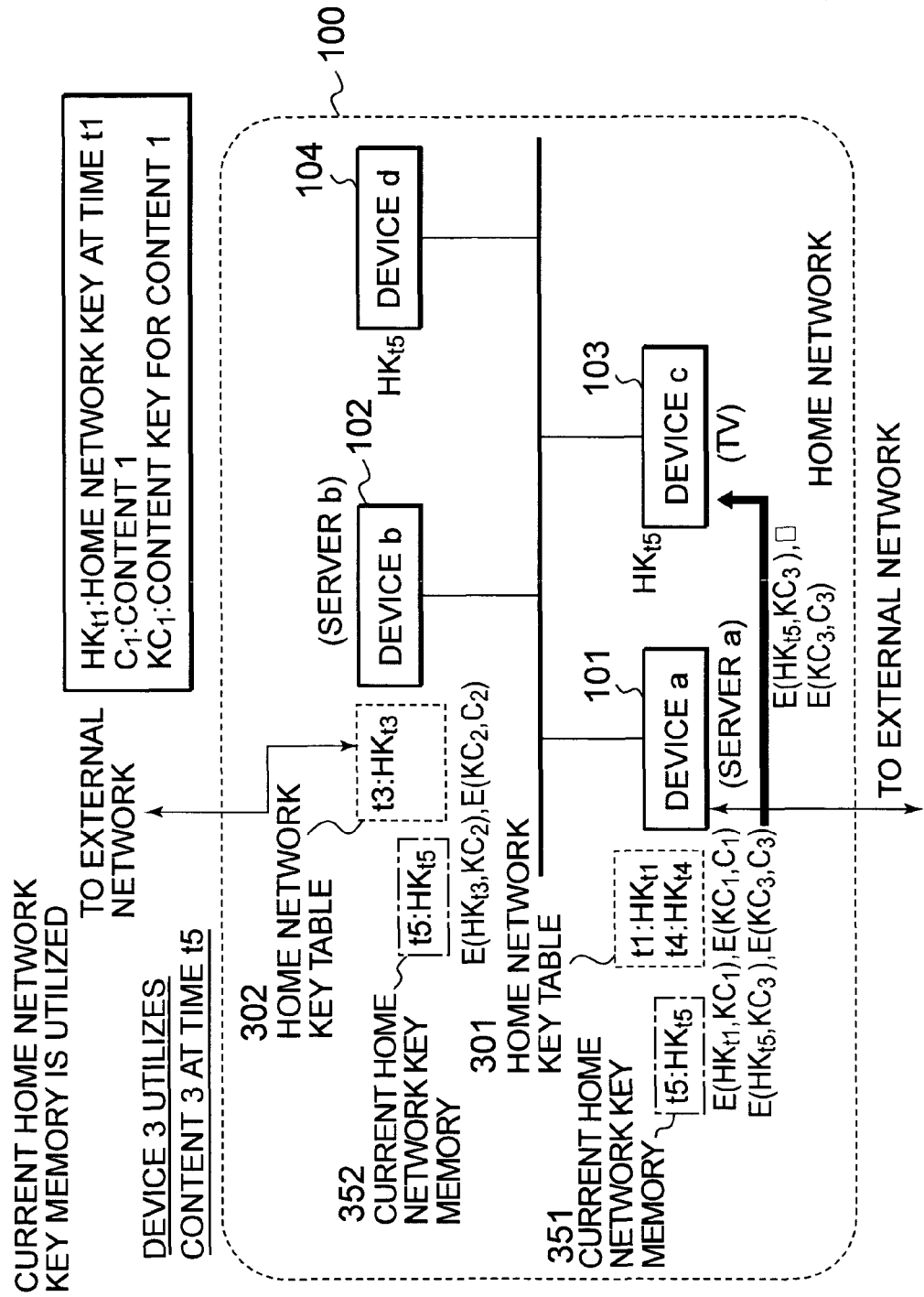
FIG. 14 is a view explaining processing to be performed by utilizing the current home network key memory in the configuration for utilizing the home network key (time=t5), which uses a home network key table according to the present invention.

Next, a process performed at a time, at which the device c 103 utilizes the content 3 [C3] stored in the server a 101, is described by referring to FIG. 14. When the process of utilizing this content 3 [C3] is performed, the process of changing the key for the content key 3 [KC3] is performed. Thus, the home network key [HKt4], which has been used for encrypting the content key 3 [KC3], becomes unnecessary.

Therefore, the server a 101 deletes this home network key from the home network key table 301, and fetches the latest updated home network key [HKt5], which is newly applied to the encryption of the content key 3 [KC3], from the current home network key memory 351, and stores the latest updated home network key [HKt5] in the home network key table 301.

However, in a case where another content key encrypted by using the home network key [HKt4], which is stored in the network key table 301, is present on the server a 101, the home network key [HKt4] stored in the network key table 301 is held without being deleted. In this case, the latest updated home network key [HKt5] stored in the current home network key memory 351 may be maintained without change. However, as described by referring to FIG. 12 previously, the process may be adapted so that the home network key to delete is selected from those stored in the network key table 301, and that the key stored in the network key table 301 is interchanged after an operation of changing the key is performed on the content key, which is encrypted by using the home network key to delete, by applying the latest updated home network key.

Figure 13:
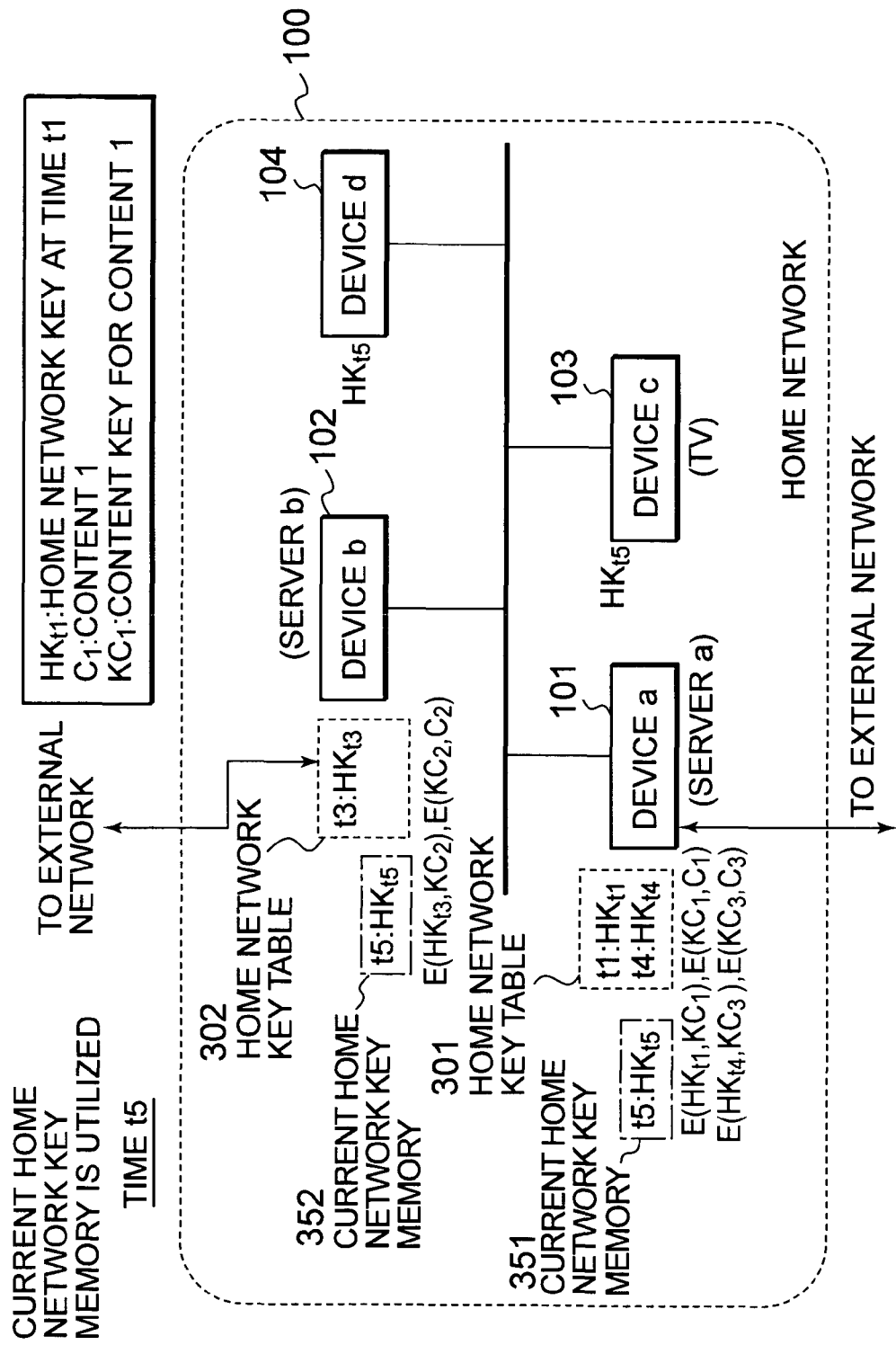
FIG. 13 is a view explaining processing to be performed by utilizing a current home network key memory in the configuration for utilizing the home network key (time=t5), which uses a home network key table according to the present invention.
Figure 15:
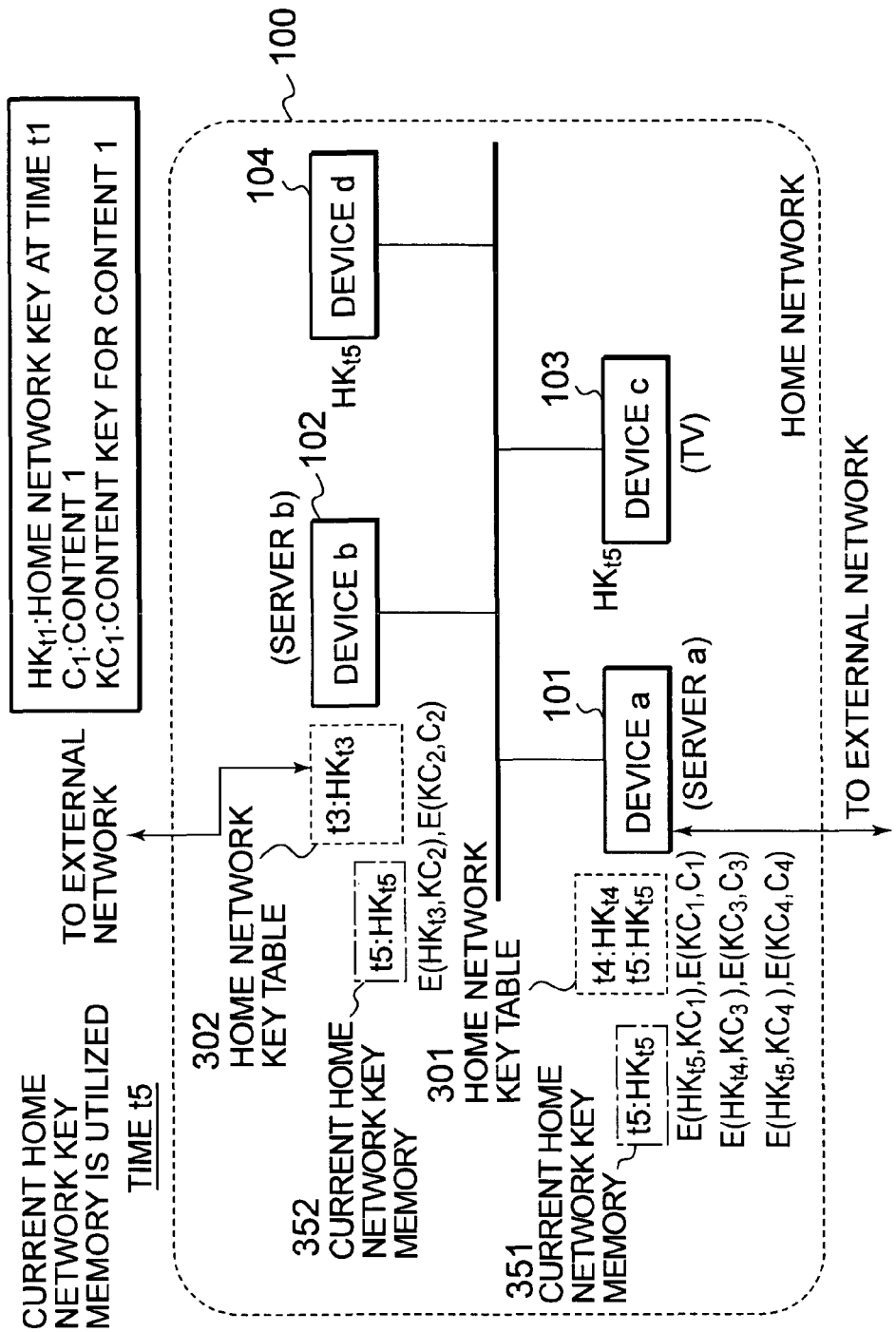
FIG. 15 is a view explaining processing to be performed by utilizing the current home network key memory in the configuration for utilizing the home network key (time=t5), which uses a home network key table according to the present invention.

Next, a description of given of the process to be performed in a case where the server a 101 receives content 4 [C4] and stores the content 4 in the storage thereof in a state shown in FIG. 13, that is, in a state in which at the time [t5], the server a 101 stores the following encrypted content keys E (HKt1, KC1), E (KC1, C1), E (HKt4, KC3), and E (KC3, C3), and the encrypted content, and in which two home network keys [HKt1] and [HKt4] in the home network key table 301 capable of storing only two home network keys and in which the latest updated home network key [HKt5] is stored in the current home network key memory 351, by referring to FIG. 15.

The server a 101 encrypts the content key 4 [KC4] for the content 4 [C4] by the home network key [HKt5] and stores the encrypted content key in the storage thereof as E (HKt5, KC4).

Therefore, it is necessary for the server a 101 to store the home network key [HKt5], which is applied to the encryption of the encrypted content key E (HKt5, KC4), in the home network key table 301. However, the two home network keys [HKt1] and [HKt4] have already been stored in the home network key table 301, so that the home network key cannot newly be stored therein.

In this case, the server a 101 selects one of the home network keys in the home network key table 301, for example, the home network key [HKt1] as an object to delete, similarly to the case above-mentioned by referring to FIG. 12. The server a 101 decrypts the content key encrypted by using the home network key [HKt1] selected as an object to delete. Then, the server a 101 encrypts the decrypted content key by the current home network key [HKt5] and stores the encrypted content key. Additionally, the server a 101 deletes the home network key [HKt1] selected as an object to delete, and stores the home network key [HKt5] in the home network key table 301.

The process performed by the server a 101 is as follows.
(1) This server encrypts the content key 4 [KC4] for the content 4 [C4] by the home network key [HKt5] stored in the current home network key memory and stores the encrypted content key as E (HKt5, KC4) in the storage thereof.
(2) This server obtains the content key 1 [KC1] by decrypting the encrypted content key E (HKt1, KC1).
(3) This server encrypts the content key 1 [KC1] by applying the updated home network key [HKt5] thereto and stores the encrypted content key e (HKt5, KC1) in the storage.
(3) This server deletes the home network key [HKt1] from the home network key table and moves the updated home network key [HKt5] from the current home network key memory and stores the updated home network key in the home network key table.

Figure 16:
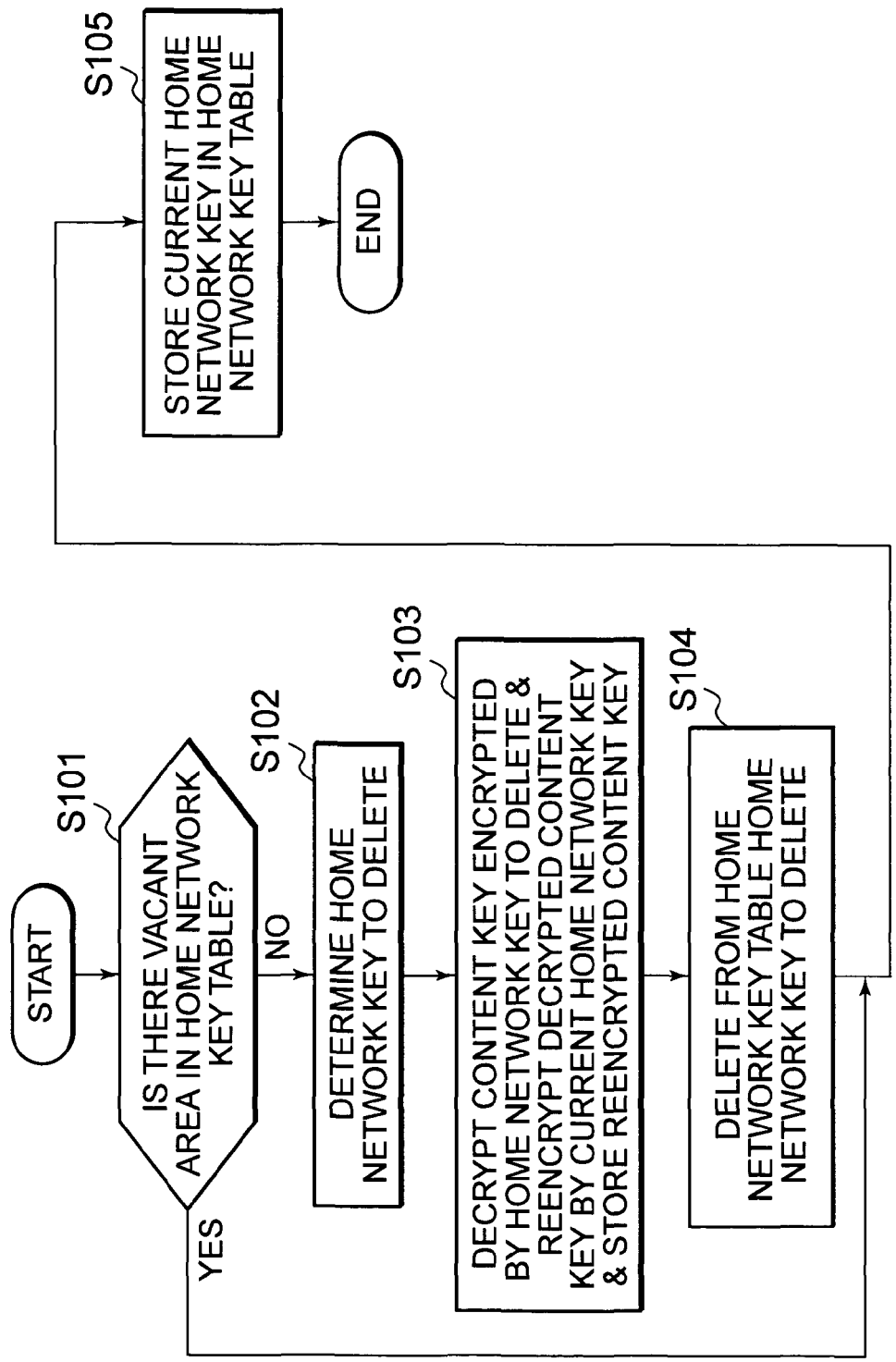
FIG. 16 is a flowchart for explaining a sequence for updating the home network key table according to the present invention.

Next, a sequence of processes performed in the above-mentioned server is described by referring to flowcharts of FIG. 16 and the following figures.

FIG. 16 is a flowchart illustrating a sequence of processes of updating the home network key table. By the way, as above-mentioned, the updating of the home network key table is performed in one of the cases (1) and (2):
(1) The updating thereof is performed appropriately with timing with which the home network key is updated.
(2) The updating thereof is performed with the timing with which the content is utilized, and with which necessity for generating the encrypted content key by applying the updated home network key thereto and for storing the generated content key in the storage is caused.

By the way, in the case (2), the server is required to have a current home network key memory that stores the latest updated home network key in a secure manner.

Processing to be performed in each of steps of FIG. 16 is described. In step S101, it is judged whether or not there is a memory area for newly storing a home network key in the home network key memory. If so, the processing proceeds to step S105, whereupon the latest updated home network key is stored in a vacant area of the home network key table. Then, the processing is finished.

If it is judged in step S101 that a memory area for newly storing the home network key is present in the home network key memory, the processing advances to step S102, whereupon the selection of the home network key to delete from the home network key table is performed. The criteria for the selection at that time are, for example, the oldest home network key, or the amount of processing to be performed by deletion, that is, the home network key that minimizes the number of the encrypted content keys by applying this home network key thereto. By the way, these criteria are preliminarily set in a processing program to be performed by the server.

If the home network key to delete from the home network key table is selected in step S102, the content key encrypted by the home network key to delete is fetched from the storage and then decrypted by applying thereto the home network key to delete, and the content key is obtained in step S103. The content key is encrypted by the current home network key to thereby generate a newly encrypted content key and store this content key. In other words, the operation of changing the key is performed.

In other words, in a case where the home network key to delete is assumed to be [HKa], and where the current home network key is assumed to be [HKb], the encrypted content key E (HKa, KCn) stored in the storage is fetched, and the home network key is decrypted by the key [HKa] to thereby obtain the content key [KCn]. Further, the content key [KCn] is encrypted by applying the current home network key [HKb] thereto. Then, an encrypted content key E (HKb, KCn) is generated and stored in the storage.

By the way, in a case where there are plural content keys encrypted by the home network key to delete, the operation of changing the key is performed on all the encrypted content keys.

If the operation of changing the key is performed on all the encrypted content keys in step S103, the home network key to delete is deleted from the home network key table in step S104. Additionally, the processing proceeds to step S105, whereupon the latest updated home network key is stored in a vacant area in the home network key table, so that the processing is finished.

Figure 17:
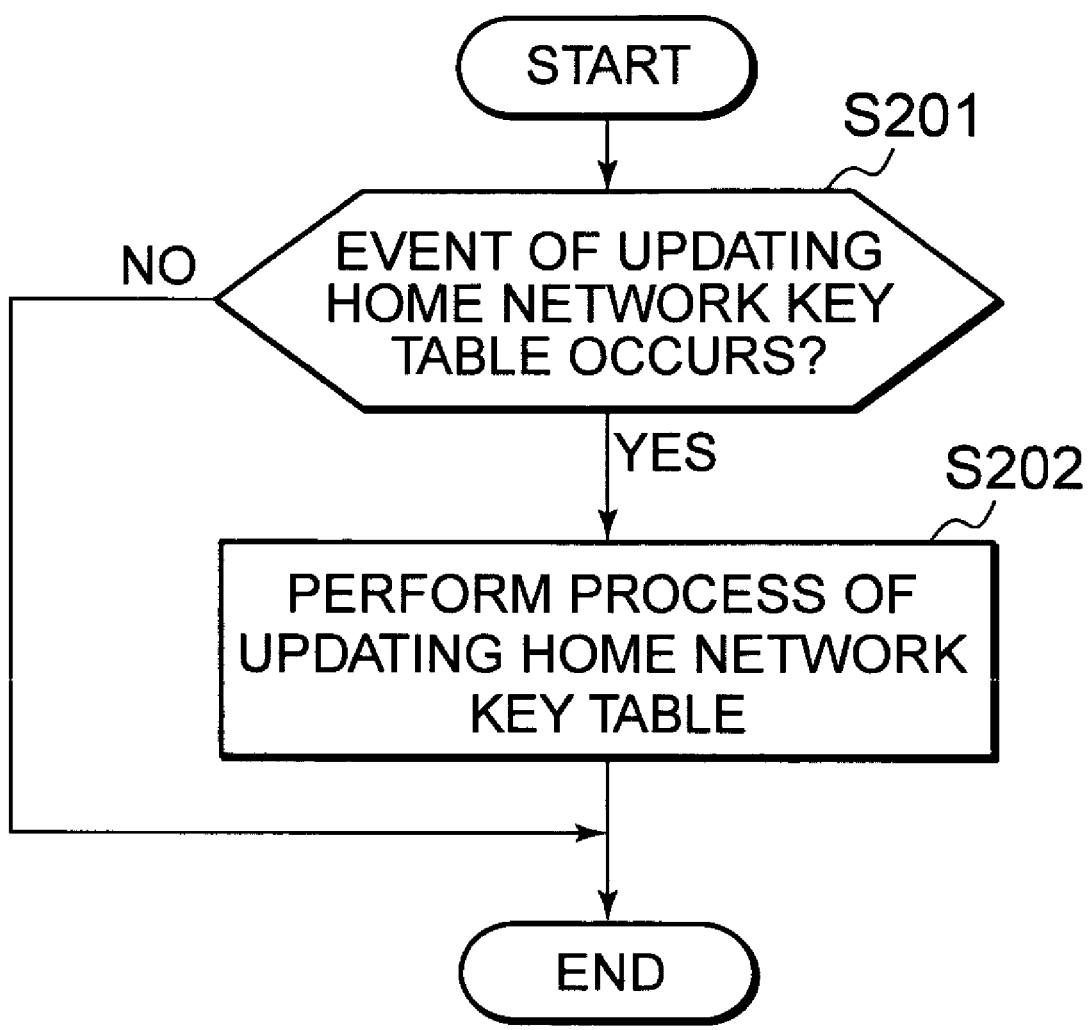
FIG. 17 is a flowchart explaining a sequence for determination of performing the updating of the home network key table according to the present invention.

FIG. 17 is a flowchart illustrating a sequence of determination of starting the updating of the home network key table in the server that has no current home network key memory. In step S201, the server judges whether or not an event of updating the home network key table occurs. The event of updating the home network key table in the server having no current home network key memory corresponds to a case where the home network key is updated, for example, a case where a due date associated with a predetermined update schedule, or where change of the network configuration, such as change of the device connected to the network occurs.

If such an event of updating the home network key table occurs in step S201, the processing advances to step S202, whereupon the updating of the home network key table is performed. By the way, the updating of the home network key table is performed according to the sequence shown in the flowchart of FIG. 16.

Figure 18:
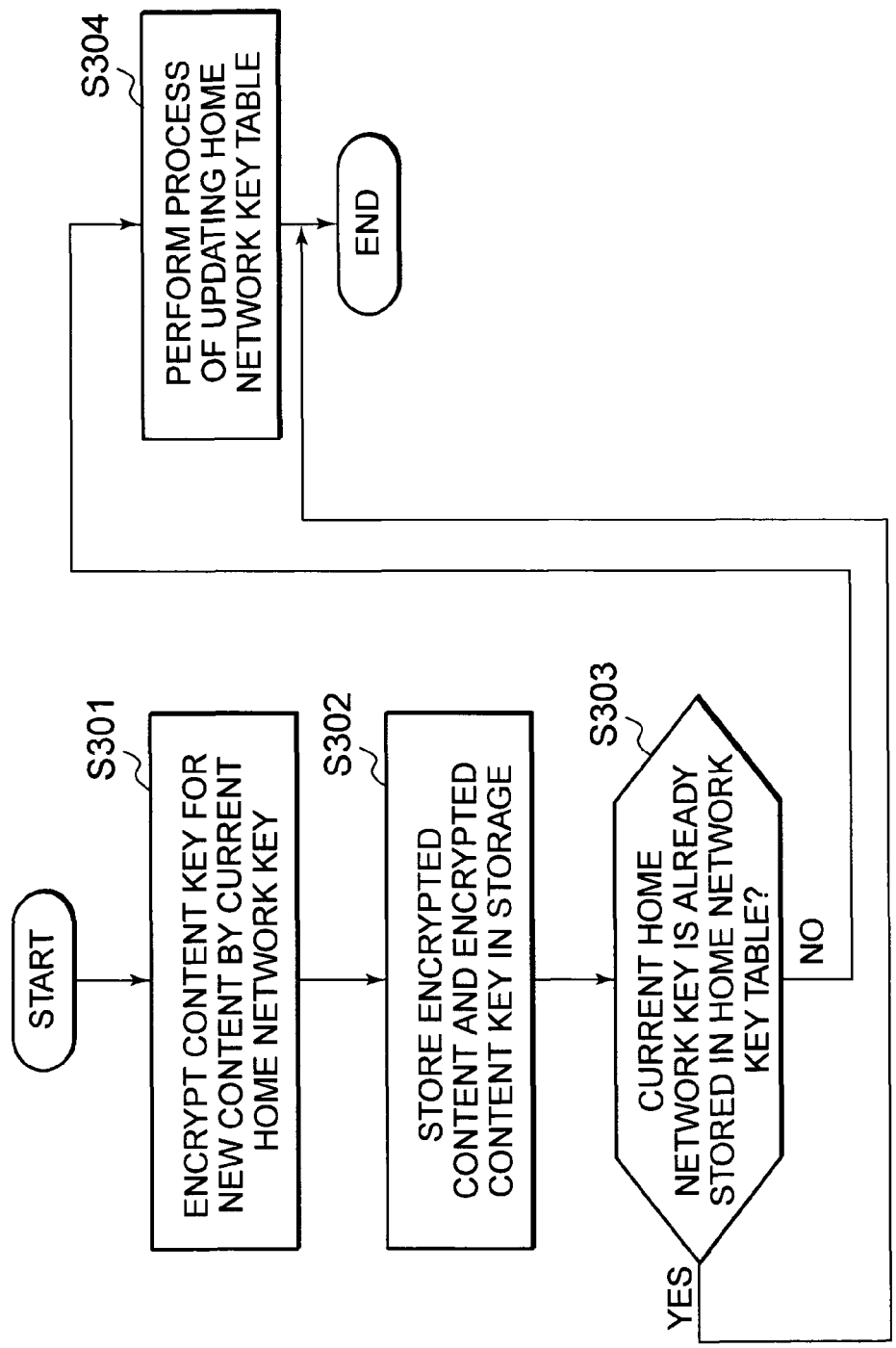
FIG. 18 is a flowchart explaining a processing sequence according to the present invention when newly inputted content is stored.

FIG. 18 is a flowchart explaining a processing sequence to be performed when the server newly receives content from the exterior and then stores the content in the storage. For example, this processing is performed when the content is stored in the storage of the server, for example, through the Internet, or when the content stored in the storage media, such as a CD, a DVD, and the like is stored in the storage of the server. By the way, it is assumed that the new content is encrypted by the content key and that the server gets this content key by techniques that are not concretely described in the present application. If this assumption does not hold, for instance, in a case where the content is not encrypted, the server generates a content key and encrypts the content. Further, even in a case that the content is encrypted, and that the format thereof cannot be utilized in the home network, the server decrypts the content once and newly generates a content key and encrypts the content in a format that can be utilized in the home network. By the way, this may include a CODEC conversion.

In step S301, the content key for the new content is encrypted by the current home network key. The current home network key is registered and stored in the home network key table. By the way, in a case where the server has a current home network key memory, the current home network key may be stored in the current home network key memory.

In step S302, the server stores the encrypted content and the encrypted content key, which correspond to the content inputted from the exterior, in the storage. In other words, let [Cn], [KCn], and [HKn] denote the content inputted from the exterior, the content key, and the current home network key, respectively. The server generates the encrypted content E (KCn, Cn) and the encrypted content key E (HCn, KCn) and stores the encrypted content and the encrypted content key in the storage (as above-mentioned, the server may get the encrypted content, which has already been generated, and store this content in the storage).

Subsequently, in step S303, it is judged whether or not the current home network key has already been stored in the home network key table. In the case that the server has the current home network key memory, sometimes, the current home network key is stored in the current home network key memory, and is not stored in the home network key table. In this case, in step S304, the updating of the home network key table is performed. By the way, the updating of the home network key table is performed according to the sequence shown in FIG. 16.

If it is confirmed in step S130 that the current home network key has already been stored in the home network key table, the processing is finished without performing the updating of the home network key table.

Figure 19:
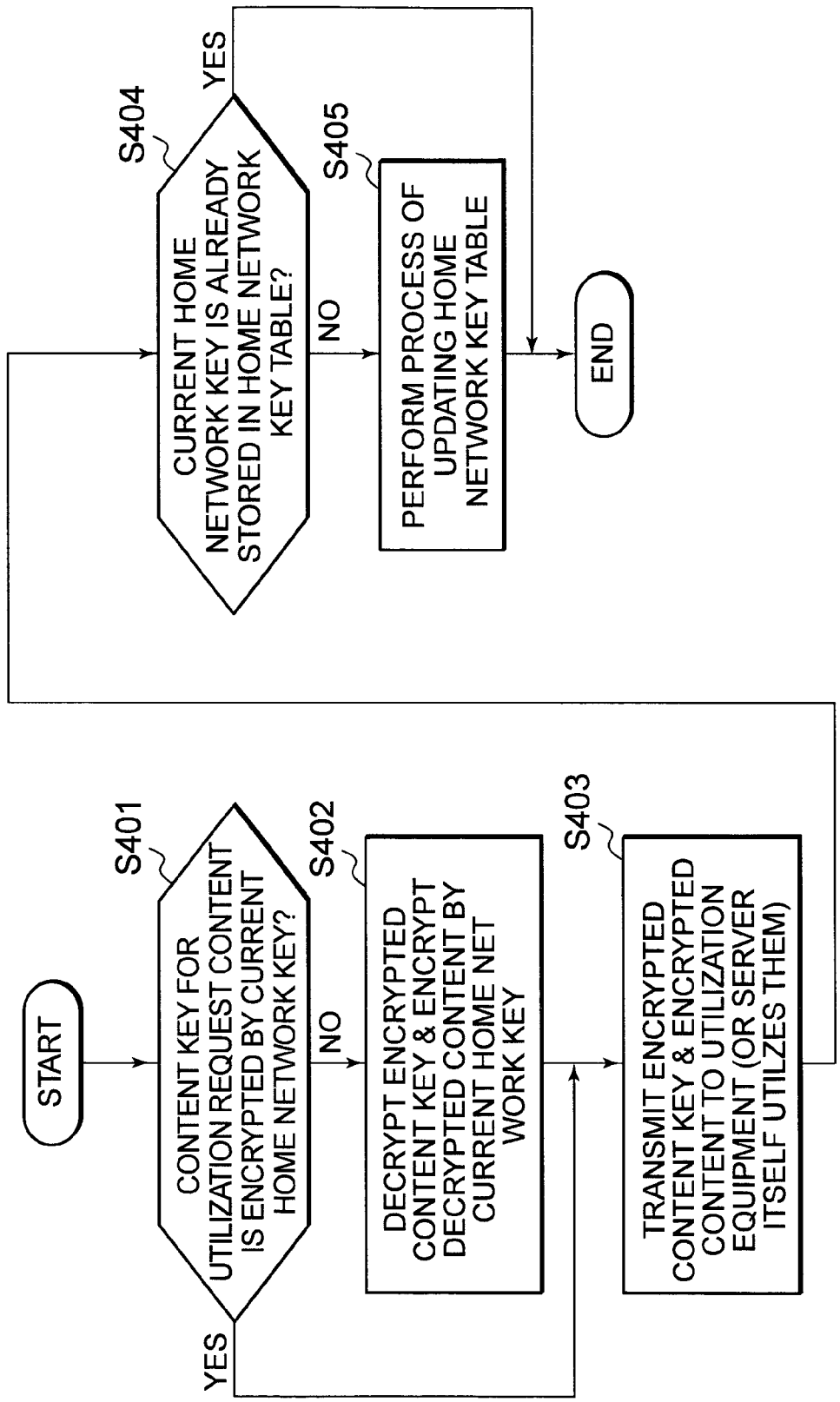
FIG. 19 is a flowchart explaining a processing sequence according to the present invention when content is utilized.

FIG. 19 is a flowchart illustrating a processing sequence performed in the server in a case where the content stored in the server is utilized by the network-connected devices or the server itself.

In step S401, the server judges whether or not a content key associated with utilization request content is encrypted by the current latest home network key. In a case where the content key associated with the utilization request content is not encrypted by the current latest home network key, the encrypted content key is decrypted and then the content key is encrypted by the current home network key and stored therein again in step S402.

In other words, let [Cn], [KCn], and [HKnew] designate the utilization request content, the content key associated with the utilization request content, and the current home network key, respectively. The server fetches the encrypted content key E (HKold, KCn) associated with the utilization request content stored in the storage. Then the server decrypts the home network key by the key [HKold] and obtains the content key [KCn]. Moreover, the server encrypts the content key [KCn] by applying the current home network key [HKnew] thereto. Then, the server generates the encrypted content key E (HKnew, KCn) and stores the generated content key.

By the way, if it is judged in step S401 that the content key associated with the utilization request content is a content key encrypted by the current latest home network key, the processing to be performed in step S402 is not performed.

Subsequently, in step S403, the encrypted content key and the encrypted content are sent to a content utilization device. In other words, the encrypted content key E (HKnew, KCn) and the encrypted content E (KCn, Cn) are sent to the content utilization device. By the way, in a case where the content utilization device is the server itself, output processing is performed in the server.

Subsequently, in step S404, the server judges whether or not the current home network key has already been stored in the home network key table. In a case that the server has the current home network key memory, sometimes, the current home network key is stored in the current home network key memory and is not stored in the home network key table. In this case, in step S405, the updating of the home network key table is performed. By the way, the updating of the home network key table is performed according to the sequence shown in the flowchart of FIG. 16.

In a case where it is confirmed in step S404 that the current home network key has already been stored in the home network key table, the processing is finished without performing the updating of the home network key table.

By the way, although the server plays a leading role in performing the updating and sharing of the home network key in the above-mentioned embodiment, the configuration of the device of the present invention is not limited thereto. For example, the processor of the present invention may be configured so that another device (for instance, the device d) or a device provided in the exterior of the home network plays a leading role in updating and sharing the home network key. Further, although the home network key table and the current home network key memory has been described as being independent of each other in the description of the above-mentioned embodiment, the home network key table and the current home network key memory are not necessarily provided as separate storage media. For example, the processor of the present invention may be configured so that a part of the home network key table is used as the current home network key memory. Furthermore, although the home network has been described as a representative example of a network in the description of the above-mentioned embodiment, the configuration of the present invention may be applied to that of any apparatus, as long as the apparatus has a configuration in which a server for storing content and a client device for utilizing the content are network-connected. The present invention can be applied to various network configurations other than that of the home network.

In the foregoing description, the present invention has been described in detail by referring to specific embodiments. However, it will be understood that various modifications and substitutions of the embodiments can be made by those skilled in the art without departing from the scope or spirit of the present invention. In other words, the present invention has been disclosed by way of examples and should not be construed as being limited. To determine the scope or spirit of the present invention, the claims appended at the beginning of the present specification should be taken into consideration.

By the way, the sequence of processing described in the present specification can be performed by hardware, software or the configuration of the combination of both hardware and software. When the processing is performed by software, the program recording the sequence of processing is installed onto a memory in a computer incorporated into dedicated hardware. Then, the program is executed by the computer. Alternatively, it is possible to install the program onto a general-purpose computer, which can perform various kinds of processing, and to cause the computer to execute the program.

For example, the program can preliminarily be recorded in a hard disk and a ROM (Read Only Memory), which serves as recording media. Alternatively, the program can temporarily or permanently be stored (or recorded) in removable recording media, such as a flexible disc, a CD-ROM (Compact Disc Read Only Memory), a MO (Magneto Optical) disc, a DVD (Digital Versatile Disc), a magnetic disc, or a semiconductor memory. Such removable recording media may be provided as what is called package software.

By the way, the program can be installed onto a computer from the above-mentioned removable recording medium. Additionally, the wireless transfer of the program to the computer from a download site can be performed. Alternatively, the program can be transferred to the computer by wire through a network, such as a LAN or the Internet. The computer receives the program transferred in such a manner. The program can be installed onto a recording medium, such as an internal hard disc.

By the way, the various kinds of processes described in the present specification may be performed in time series according to the disruption thereof, or may be performed in parallel or individually, according to the performance of an apparatus performing the processes, or when needed. Additionally, in the present specification, the term "system" designates a logical set of plural devices. The devices in each of the configurations are not limited to those provided in the same casing.

As above-mentioned, according to the configurations of the present invention, there is provided a content providing server for holding a content key encrypted by a network key, which is shared by network-connected devices in a home network or the like and appropriately updated, in a storage, together with encrypted content. The content providing server is configured in such a way as to hold a network key table in which network keys including all pre-update network keys, which are being applied as encryption keys for the encrypted content keys stored in the storage, are registered and stored. Thus, it is sufficient to perform a key changing operation of changing a content key, which is encrypted by a pre-update network key, to an encrypted key, to which an updated network key is applied, only when needed, for example, at an occurrence of utilization of the content. Consequently, key changing operations wastefully performed are reduced to thereby alleviate processing load. The configuration of the present invention can be utilized as those of content providing servers in various networks, such as a home network.

Further, the configuration according to the present invention is adapted so that a current network key memory for storing an updated network key is set therein. Thus, when the updated network key is applied to the encryption of the encrypted content key, the updated network key is moved and stored in the network key table. Consequently, it is sufficient to update the network key table only in a case where the necessity for the update occurs. Thus, the processing load on the content providing server can be alleviated. Furthermore, in a case where there is a limit to the memory capacity of the network key table for storing plural network keys, a key to delete is selected according to certain selection criteria. For instance, the oldest key is selected. Alternatively, in a case that the load on the operation of changing a key has a minimum value, this key is selected. Then, an operation of changing an encrypted content key, to which the key to delete is applied, is performed, and the updated network key is stored in the table. Thus, even in a case where the capacity of the key table in the server is small, a reliable operation can be performed. The present invention can be applied even to a content providing server whose configuration is limited.

What is claimed is:

1. A method of providing content to a terminal device in a network, the method comprising:
   storing, in memory, a first content encrypted by a first content key, the first content key encrypted by a first network key, a second content encrypted by a second content key, and the second content key encrypted by the first network key;
   storing, in a network key storage, the first network key, wherein the first network key is shared with the terminal device;
   receiving a second network key as an update of the first network key, wherein the second network key is shared with the terminal device;
   receiving a request for the first content;
   performing a key update triggered by the request, the key update comprising:
      decrypting the first content key with the first network key;
      encrypting the decrypted first content key with the second network key;
      decrypting the second content key with the first network key;
      encrypting the decrypted second content key with the second network key; and
      storing, in the memory, the second content key encrypted by the second network key; and
   sending the first content encrypted by the first content key and the first content key encrypted by the second network key to the terminal device in response to the request.

2. The method of claim 1, further comprising:
   storing the second network key in a current network key memory; and
   transferring the second network key from the current network key memory to the network key storage upon performing the key update.

3. The method of claim 2, further comprising:
   encrypting the decrypted second content key with the second network key stored in the current network key memory.

4. The method of claim 1, further comprising:
   selecting a network key to be deleted from the network key storage;
   deleting the selected network key from the network key storage; and
   storing an updated network key in the network key storage to replace the selected network key.

5. The method of claim 4, wherein the selected network key is the first network key, the updated network key is the second network key, and wherein the deleting occurs after performing the key update.

6. The method of claim 4, wherein the selected network key is the oldest network key in the network key storage.

7. A non-transitory computer-readable medium having tangibly embodied thereon program instructions, which, when executed by a processor, cause the processor to perform a method of providing content to a terminal device in a network, the method comprising:
   storing, in memory, a first content encrypted by a first content key, the first content key encrypted by a first network key, a second content encrypted by a second content key, and the second content key encrypted by the first network key;
   storing, in a network key storage, the first network key, wherein the first network key is shared with the terminal device;
   receiving a second network key as an update of the first network key, wherein the second network key is shared with the terminal device;
   receiving a request for the first content;
   performing a key update triggered by the request, the key update comprising:
      decrypting the first content key with the first network key;
      encrypting the decrypted first content key with the second network key;
      decrypting the second content key with the first network key;
      encrypting the decrypted second content key with the second network key; and storing, in the memory, the second content key encrypted by the second network key; and sending the first content encrypted by the first content key and the first content key encrypted by the second network key to the terminal device in response to the request.

8. The computer-readable medium of claim 7, the method further comprising:

storing the second network key in a current network key memory; and transferring the second network key from the current network key memory to the network key storage upon performing the key update.

9. The computer-readable medium of claim 8, the method further comprising:

encrypting the decrypted second content key with the second network key stored in the current network key memory.

10. The computer-readable medium of claim 7, the method further comprising:

selecting a network key to be deleted from the network key table;

deleting the selected network key from the network key storage; and storing an updated network key in the network key storage to replace the selected network key.

11. The computer-readable medium of claim 10, wherein the selected network key is the first network key, the updated network key is the second network key, and wherein the deleting occurs after performing the key update.

12. The computer-readable medium of claim 10, wherein the selected network key is the oldest network key in the network key storage.

13. The method of claim 1, further comprising:

periodically receiving updated network keys also shared with the terminal device; and maintaining, in the network key storage, those of the periodically received updated network keys that encrypt one or more content keys stored in the memory.

14. The method of claim 1, wherein the network key storage comprises one or more tables.

15. The computer-readable medium of claim 7, the method further comprising:

periodically receiving updated network keys also shared with the terminal device; and maintaining, in the network key storage, those of the periodically received updated network keys that encrypt one or more content keys stored in the memory.

16. The computer-readable medium of claim 7, wherein the network key storage comprises one or more tables.

* * * * *